(12) United States Patent
Furuta et al.

(10) Patent No.: US 9,789,656 B2
(45) Date of Patent: Oct. 17, 2017

(54) METHODS FOR PRODUCING MOLDING DIE, WAFER LENS, AND OPTICAL LENS

(75) Inventors: Katsuki Furuta, Hachioji (JP); Hiroyuki Matsuda, Sagamihara (JP)

(73) Assignee: KONICA MINOLTA, INC., Tokyo (JP)

( * ) Notice: Subject to any disclaimer, the term of this patent is extended or adjusted under 35 U.S.C. 154(b) by 963 days.

(21) Appl. No.: 14/000,538

(22) PCT Filed: Mar. 5, 2012

(86) PCT No.: PCT/JP2012/055589
§ 371 (c)(1),
(2), (4) Date: Aug. 20, 2013

(87) PCT Pub. No.: WO2012/121221
PCT Pub. Date: Sep. 13, 2012

(65) Prior Publication Data
US 2013/0328224 A1    Dec. 12, 2013

(30) Foreign Application Priority Data
Mar. 7, 2011   (JP) .................. 2011-049714

(51) Int. Cl.
*B29D 11/00* (2006.01)
*B29C 33/38* (2006.01)
(Continued)

(52) U.S. Cl.
CPC .... *B29D 11/00317* (2013.01); *B29C 33/3857* (2013.01); *B29C 35/0888* (2013.01);
(Continued)

(58) Field of Classification Search
CPC ........ B29D 11/00317; B29D 11/00307; B29C 43/36; B29C 43/021; B29C 35/0888;
(Continued)

(56) References Cited

U.S. PATENT DOCUMENTS

2006/0259546 A1   11/2006   Rudmann et al.
2010/0079642 A1   4/2010    Kurimoto et al.
2010/0290123 A1   11/2010   Yamada et al.

FOREIGN PATENT DOCUMENTS

JP   2010-102312 A   5/2010
JP   2010-191001 A   9/2010
(Continued)

OTHER PUBLICATIONS

International Search Report in International Application No. PCT/JP2012/055589, dated May 29, 2012, 2 pages.

*Primary Examiner* — Robert J Grun
(74) *Attorney, Agent, or Firm* — Brinks Gilson & Lione

(57) ABSTRACT

A resin amount for forming each first-stage resin layer portion (a first-stage resin replica portion) 41*da* in a first process is defined to be greater than a resin amount for forming each second-stage resin layer portion (a second-stage resin replica portion) 41*db* in a second process. Therefore, at a boundary between the first-stage resin layer portion 41*da* and the second-stage resin layer portion 41*db*, a joint portion 48 at which resin overlaps is formed, whereby occurrence of an undercut shape can be avoided. Therefore, in a molding process using a sub-master die 40 and a sub-sub-master die 50 obtained from the sub-master die 40, occurrence of an undesired shape can be avoided, whereby mold release resistance can be reduced or eliminated.

19 Claims, 14 Drawing Sheets

(51) Int. Cl.
*B29C 35/08* (2006.01)
*G02B 3/00* (2006.01)
*B29C 43/02* (2006.01)
*B29C 43/36* (2006.01)
*B29L 11/00* (2006.01)

(52) U.S. Cl.
CPC ............ *B29C 43/021* (2013.01); *B29C 43/36* (2013.01); *B29D 11/00307* (2013.01); *G02B 3/0031* (2013.01); *B29C 2035/0827* (2013.01); *B29L 2011/0016* (2013.01)

(58) Field of Classification Search
CPC ........ B29C 33/3857; B29C 2035/0827; G02B 3/0031; B29L 2011/0016
See application file for complete search history.

(56) References Cited

FOREIGN PATENT DOCUMENTS

| | | | | |
|---|---|---|---|---|
| JP | 2010-266667 A | | 11/2010 | |
| JP | WO 2010143466 A1 | * | 12/2010 | ....... B29D 11/00307 |
| JP | 2011-13577 A | | 1/2011 | |
| WO | WO-2012102249 | * | 2/2012 | ............. B29C 33/38 |

\* cited by examiner

METHODS FOR PRODUCING MOLDING DIE, WAFER LENS, AND OPTICAL LENS

TECHNICAL FIELD

This application is a National Stage application of International Application No. PCT/JP2012/055589, filed Mar. 5, 2012.

The present invention relates to methods for producing a molding die used to produce a wafer lens which includes a plurality of optical lenses and for producing a wafer lens and optical lenses using this molding die. More specifically, the present invention relates to a method for producing a molding die obtained by forming a resin-made shape transfer layer by transferring on a substrate and methods for producing a wafer lens and optical lenses.

BACKGROUND ART

Recently, obtaining individual optical lens by producing a wafer-shaped plate member (a wafer lens) in which multiple optical lenses are formed and then dividing into single pieces has been studied. As a method for transferring micro-optical parts on a wafer scale, producing a first generation reproduction tool made of, for example, resin by transferring with repeated use of a small master die, then, producing a plurality of sub-master dies from the first generation reproduction tool, and producing a plurality of second generation reproduction tools provided with multiple micro-optical elements from the sub-master dies has been proposed (see Patent Literature 1). The wafer-shaped first generation reproduction tool obtained by this method is a molding die for producing a subsequent molded product and is a tool constituted by a resin-made shape transfer layer formed on a substrate.

In addition, as a method for forming a molding die, which is used for producing a wafer lens and in which a resin-made shape transfer layer is provided on a substrate, in order to, for example, prevent unsuccessful mold release at the time of releasing a molded product from a master substrate, a method for producing a molding die by forming a plurality of recessed portions which are closed inside them on a substrate for molding die, injecting a resin material into each of the recessed portions, and then pressing the recessed portions with a master die has also been proposed (see Patent Literature 2).

Recently, versatility of small-sized optical lenses has been increased and it has been required that the optical lenses have intended accurate lens shape so that desired optical performance may be demonstrated. In order to improve the optical performance, a plurality of optical lenses may be stacked. From these viewpoints, it is required that the thickness of a resin layer of the wafer lens is not excessively large. If the thickness of the resin layer of the wafer lens is excessively thick, it is possible that desired optical performance is not demonstrated or that warpage, deformation and the like may be caused in the wafer lens due to increased stress of the resin layer. Further, there is a possibility that the entire size is increased when the optical lenses are stacked. There is also a problem that the material cost may be increased and the curing time may become longer.

In order to prevent the thickness of the resin layer of the wafer lens from being excessively large, it is required to produce the molding die which includes the resin-made shape transfer layer described above in consideration of this, and it is necessary that molding is performed with the master die being brought close to the substrate for molding die as much as possible at the time of producing the molding die. This is because, if the resin-made shape transfer layer of the molding die becomes thick, it is not possible to reduce the thickness of the resin layer of the finally obtained wafer lens since the shape is transferred also to a molded product molded using this molding die.

Typically, it is necessary to press the master die against the substrate for molding die with large pressure to bring the master die close to the surface of the substrate for molding die in a state in which a resin material is disposed between the master die and the substrate for molding die. Therefore, the size of a production device becomes large and it becomes difficult to ensure the positioning accuracy of the master die. Further, if the master die is inclined for some reason, there is also a possibility that the master die may be in contact with a sub-master substrate, thereby damaging the sub-master substrate and the master die. It is also considered that the resin material overflows from a periphery of the master die at the time of molding and the overflowed portion forms an unintended shape. Especially if recessed portions which are closed inside them are provided on a substrate for molding die as in Patent Literature 2, the space between the peripheral edges of the recessed portions and a peripheral edge of the master die is significantly narrow at the time of molding and, therefore, a possibility that resin overflows is even more increased due to, for example, variation in the resin amount injected in the recessed portions and minor errors in distance between the master die and the substrate for molding die. If the distance among each molding position by the master die is shortened in order to increase the number of optical lenses to be obtained from a single wafer lens, the overflowed resin may gather and rise, thereby forming projections. Therefore, a possibility of producing an unintended shape is even further increased. On the other hand, if the resin amount is reduced so that the resin material does not overflow from the periphery of the master die during the molding, a step portion is formed at the periphery of the master die which may become an overhang shape or an undercut shape (a projecting shape) having a downward slope. It has been found that such a step portion creates mold release resistance in the next molding process in which this molding die is used. The mold release resistance causes local shape distortion, failure in molding, such as breakage of the step portion, a decrease in molding durability of the substrate, and the like. Especially in a case where the total of edge sides (end sides) corresponding to the circumference of the master die is long, if, for example, the piece is large in size with an increased number of optical surfaces inside the master die, the mold release resistance generated locally increases and various harmful effects become significant.

CITATION LIST

Patent Literature

1: U.S. Patent Application Publication No. 2006/0259546
2: Japanese Unexamined Patent Application Publication No. 2010-102312

SUMMARY OF INVENTION

An object of the present invention is to provide a method for producing a molding die which has an intended shape and by which a wafer lens on which optical lenses which may demonstrate desired optical performance are formed may be produced.

Another object of the present invention is to provide methods for producing a wafer lens and optical lenses which are highly precise using a molding die obtained by the method for producing described above.

To solve the above problem, a first method for producing a molding die according to the present invention in which the molding die which includes a plurality of resin replica portions are obtained by molding the plurality of resin replica portions on a first substrate by repeatedly using a master die which includes a first molding surface on which a shape corresponding to an optical lens is formed, the method comprising: a first process of forming, at one of alternate positions of a checkerboard pattern (checks) of the first substrate, a plurality of first-stage resin replica portions among the plurality of resin replica portions by disposing a resin material between the master die and the first substrate; a second process of forming, at the other of alternate positions of the checkerboard pattern of the first substrate, a plurality of second-stage resin replica portions among the plurality of resin replica portions by disposing the resin material between the master die and the first substrate, wherein, in the second process, each of the second-stage resin replica portions is formed such that an end of each of the second-stage resin replica portion overlaps an end of each of the first-stage resin replica portion formed in the first process.

According to the production method described above, the first-stage resin replica portions isolated from the surroundings are formed first and then the second-stage resin replica portions surrounded by the first-stage resin replica portions are formed. At this time, since an end of each of the second-stage resin replica portion overlaps an end of each of the first-stage resin replica portion, occurrence of an undercut shape or an overhang shape can be avoided. Therefore, in a molding process using the present molding die, occurrence of an undesired shape can be avoided, whereby mold release resistance can be reduced or eliminated. In this manner, by reducing formation of local mold release resistance distribution and suppressing local deformation during the molding of a wafer lens, a difference in shape among multiple lenses existing in the wafer lens can be eliminated and molding accuracy can be increased, whereby the lens which is stable in accuracy can be provided.

According to particular aspect or focus of the present invention, in the method for producing a molding die, the first molding surface includes a plurality of first optical transfer surfaces arranged in two dimensions. In this case, since the first molding surface includes a plurality of first optical transfer surfaces, the number of lenses to be obtained from the first substrate can be increased. Further, since the number of times of transferring, i.e., stamping, using the master die can be reduced, the working time in the production of the molding die can be shortened.

According to further another aspect, in the first process, each of the first-stage resin replica portions is molded with a resin amount with which a width of 50% or greater and narrower than 100% is covered with respect to a distance between the master die when each of the first-stage resin replica portions is formed and the master die when its adjacent second-stage resin replica portion is formed. By filling the space between the master dies in the range described above with resin in the first process, reproducibility of an overlapping state of an outer edge of the second-stage resin replica portion over an outer edge of the first-stage resin replica portion in the second process is increased.

A second method for producing a molding die according to the present invention, in which the molding die which includes a plurality of resin replica portions are obtained by molding the plurality of resin replica portions on a first substrate by repeatedly using a master die which includes a first molding surface on which a shape corresponding to an optical lens is formed, the method comprising: a first process of forming, at one of alternate positions of a checkerboard pattern of the first substrate, a plurality of first-stage resin replica portions among the plurality of resin replica portions by disposing a resin material between the master die and the first substrate; a second process of forming, at the other of alternate positions of the checkerboard pattern of the first substrate, a plurality of second-stage resin replica portions among the plurality of resin replica portions by disposing the resin material between the master die and the first substrate, wherein a resin amount for forming each of the first-stage resin replica portions in the first process is defined to be greater than a resin amount for forming each of the second-stage resin replica portions in the second process.

According to the production method described above, the first-stage resin replica portions isolated from the surroundings are formed first and then the second-stage resin replica portions surrounded by the first-stage resin replica portions are formed. At this time, the resin amount for forming each of the first-stage resin replica portions in the first process is defined to be greater than the resin amount for forming each of the second-stage resin replica portions in the second process. Therefore, the resin overlaps and lies at a boundary between the first-stage resin replica portion and the second-stage resin replica portion, whereby occurrence of the undercut shape or the overhang shape can be avoided. Therefore, in a molding process using the present molding die, occurrence of an undesired shape can be avoided, whereby mold release resistance can be reduced or eliminated. In this manner, by reducing formation of local mold release resistance distribution and suppressing local deformation during the molding of the wafer lens, a difference in shape among multiple lenses existing in the wafer lens can be eliminated and molding accuracy can be increased, whereby the lens which is stable in accuracy can be provided.

According to further another aspect, a ratio of the resin amount in the first process to the resin amount in the second process (that is, the value of the former/the latter) is higher or equal to 1.05 and lower or equal to 2.00. In this case, the outer edge of the second-stage resin replica portion suitably overlaps the outer edge of the first-stage resin replica portion. Further, it is possible to form a joint portion which connects adjoining resin replica portions into a shape other than the projection shape or the undercut shape.

According to further another aspect, the master die includes an end portion of prism-like shape which is chamfered at corners thereof. In this case, formation of thick joint portions outside the corners in the diagonal directions of each of the resin replica portions can be avoided.

According to further another aspect, the end portion of the master die includes chamfered flat surfaces at the corners, and a breadth of each flat surface is one-twentieth or greater and is one-third or smaller of one that is greater in width among two wall surfaces adjacent the flat surface. In this case, formation of thick joint portions outside the corners in the diagonal directions of the resin replica portion can be avoided without reducing the number of lens to be obtained from the wafer lens.

According to further another aspect, when at least one area, among the other of alternate positions of the checkerboard pattern, of which all the sides capable of being surrounded are surrounded by the first-stage resin replica portions is produced, the second-stage resin replica portion is molded at that area. In this case, the first-stage resin replica portion and the second-stage resin replica portion can be formed in parallel.

According to further another aspect, the first substrate includes a recessed portion which is greater in size than the first molding surface and has a shape closed inside itself at a molding position corresponding to the resin replica portion, and the master die includes an annular step in the periphery of the first molding surface. In this case, by providing the annular steps in the peripheries of the first molding surface, a space into which the resin material may spread can be formed between the step and the periphery of the recessed portion. Therefore, even if the molding surface of the master die is disposed close to the height of the flat surface of the first substrate, since the space is filled with the resin material, occurrence of abnormal shapes caused by overflow or lack of the resin material can be avoided.

According to further another aspect, the first process and the second process comprise: a transfer process to obtain the resin replica portion to which the first molding surface is transferred by filling a space between the first molding surface and a molding position on the first substrate with a first resin material, curing the first resin material, and then releasing the master die; and a repeating process to obtain a first shape transfer layer in which the plurality of resin replica portions are arranged in two dimensions on the first substrate by repeatedly performing the transfer process while changing relative positions of the master die and the first substrate.

According to further another aspect, a second molding die including a second shape transfer layer is obtained by using a molding die which includes the first shape transfer layer obtained by the method for producing a molding die described above as a first molding die, filling a space between the first molding die and a second substrate for molding die with a second resin material; curing the second resin material, and releasing the first molding die. In this case, the second molding die is a molding die for collective transfer used for forming, for example, a wafer lens.

A method for producing a wafer lens according to the present invention, the method comprises a process to obtain a wafer lens which includes a plurality of lens elements formed on a front surface of a third substrate by filling a space between the molding die obtained by the method for producing a molding die above and the third substrate with a third resin material, curing the third resin material, and releasing the molding die. In this case, for example, a wafer lens provided with a plurality of lens elements on one side of the third substrate can be obtained through reproduction by using transfer of the second molding die and the like.

A method for producing a wafer lens according to the present invention, the method comprises a process to obtain a wafer lens obtained by the method for producing a molding die above which includes a plurality of lens elements formed on a back surface of the third substrate by filling a space between the molding die obtained by the method for producing a molding die above and the back surface of the wafer lens obtained by the method for producing a wafer lens above with a fourth resin material, curing the fourth resin material, and releasing the molding die. In this case, for example, a wafer lens provided with a plurality of lens elements on both sides of the third substrate can be obtained through reproduction by using transfer of the second molding die and the like.

A method for producing an optical lens according to present invention comprises a process to divide by cutting the wafer lens obtained by the method for producing a wafer lens above. In this case, multiple high-performance optical lenses divided from a lens substrate can be obtained collectively.

DESCRIPTION OF EMBODIMENTS

First Embodiment

With reference to the drawings, a wafer lens finally obtained by using a method for producing a molding die according to first embodiment of the present invention will be described. A structure and a method for producing a molding die for producing such a wafer lens will be described.

[A: Structures of Wafer Lens and Other Components]

Figure 1:
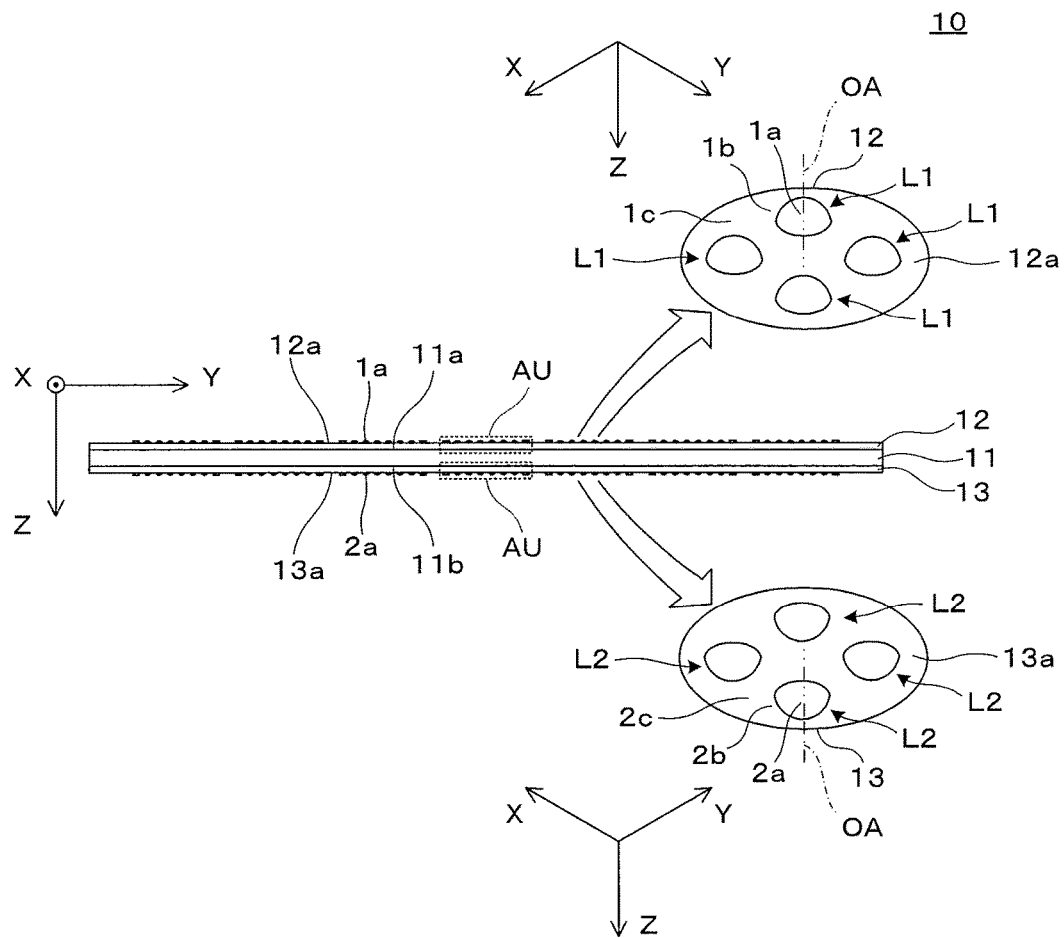
FIG. 1 is a side view of a wafer lens (a lens substrate) obtained by a producing method for a first embodiment, which includes partial enlarged perspective views of front and back sides.

As illustrated in FIG. 1, a wafer lens 10 has a disc-like outer shape, and includes a substrate 11, a first lens resin layer 12 and a second lens resin layer 13. In the present embodiment, the wafer lens 10 may be referred also to as a lens substrate. Note that, in FIG. 1, surfaces of the first lens resin layer 12 and the second lens resin layer 13 are partially enlarged and illustrated as perspective views.

The substrate 11 of the wafer lens (a lens substrate) 10 is a circular plate (later-described third substrate) embedded at the center of the wafer lens 10, and is made of light transmissive glass. An outer diameter of the substrate 11 is substantially the same as those of the first and the second lens resin layers 12 and 13. The thickness of the substrate 11 is basically determined in accordance with optical specifications. The thickness is determined such that the substrate 11 is not damaged at least when a molded product is released to obtain the wafer lens 10.

The first lens resin layer 12 is a light transmissive layer and is formed on one surface 11a of the substrate 11. As illustrated in the partially enlarged perspective view, in the first lens resin layer 12, multiple first lens elements L1 each constituted by a first lens body 1a and a first flange portion 1b as a set are arranged in two dimensions on an XY plane. These first lens elements L1 are collectively molded via a connecting portion 1c. A surface on which each first lens element L1 and the connecting portion 1c are combined with each other is a first transfer target surface 12a which is collectively molded by transferring. As illustrated also in FIG. 2, the first lens body 1a, for example, is a convex-shaped aspherical or spheric lens portion, and includes a first optical surface OS1. The surrounding first flange portion 1b includes a flat first flange surface FP1 which spreads around the first optical surface OS1, and an outer periphery of the first flange surface FP1 is formed also as a surface of the connecting portion 1c. The first flange surface FP1 is disposed in parallel with the XY plane which is vertical to an optical axis OA.

Note that, as illustrated in FIG. 1, the first lens resin layer 12 is divided into multiple array units AU due to its production process. Although not illustrated in detail, these array units AU have rectangular outlines and are arranged in a matrix pattern or a latticed pattern on the substrate 11. Each array unit AU has a surface shape which substantially corresponds to a reversed shape of an end surface 30b of a master die 30 which will be described later. Each array unit AU includes multiple first lens bodies 1a arranged at regular intervals in a matrix pattern.

The first lens resin layer 12 is made of, for example, light-curing resin. The light-curing resin is obtained by curing a light-curing resin material which includes polymerizable composition, such as a polymerizable monomer, which is a principal constituent, a photopolymerization initiator for starting polymerization curing of the polymerizable composition, and various additives used if necessary. Such a light-curing resin material has flowability in a state before curing. Examples of the light-curing resin include epoxy resin, acrylic resin, allyl ester resin and vinyl resin. Epoxy resin may be obtained by reaction curing of the polymerizable composition by cationic polymerization of photopolymerization initiator. Acrylic resin, allyl ester resin and vinyl resin may be obtained by reaction curing of the polymerizable composition by radical polymerization of the photopolymerization initiator.

Like the first lens resin layer 12, the second lens resin layer 13 is a light transmissive layer, and is formed on the other surface 11b of the substrate 11. As illustrated in the partially enlarged perspective view, in the second lens resin layer 13, multiple second lens elements L2 each constituted by a second lens body 2a and a second flange portion 2b as a set are arranged in two dimensions on an XY plane. These second lens elements L2 are collectively molded via a connecting portion 2c. A surface on which each second lens element L2 and the connecting portion 2c are combined with each other is a second transfer target surface 13a which is collectively molded by transferring. As illustrated also in FIG. 2, the second lens body 2a is, for example, a convex-shaped aspherical or spheric lens portion, and includes a second optical surface OS2. The surrounding second flange portion 2b includes a flat second flange surface FP2 which spreads around the second optical surface OS2. An outer periphery of the second flange portion FP2 is formed also as a surface of the connecting portion 2c. The second flange surface FP2 is disposed in parallel with the XY plane which is vertical to an optical axis OA.

Note that the second lens resin layer 13 is also divided into multiple array units AU due to its production process. These array units AU have rectangular outlines and are arranged in a matrix pattern or a latticed pattern on the substrate 11.

The light-curing resin used for the second lens resin layer 13 is the same light-curing resin as that used for the first lens resin layer 12. However, it is not necessary that both the lens resin layers 12 and 13 are made of the same light-curing resin: these lens resin layers 12 and 13 may be made of different types of light-curing resin.

Note that any one of the first lens resin layer 12 and the second lens resin layer 13 may be omitted. That is, the lens resin layer may be provided only in one surface 11a or in the other surface 11b of the substrate 11.

Figure 2:
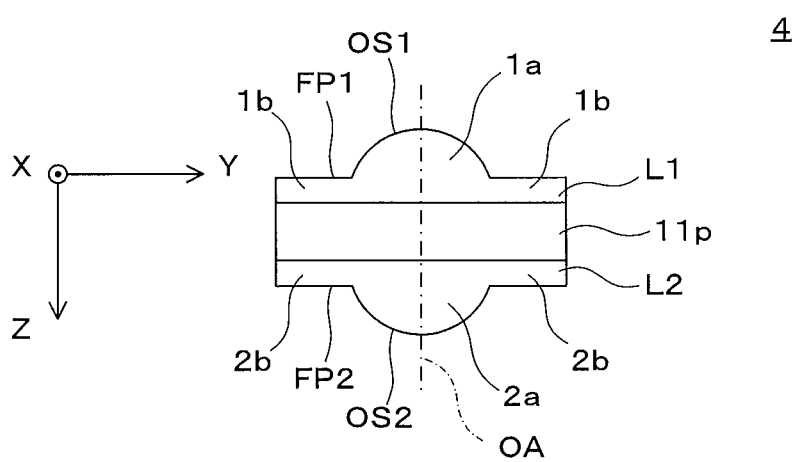
FIG. 2 is a side view of an optical lens obtained from the wafer lens of FIG. 1.

As illustrated in FIG. 2, any one of the first lens elements L1 provided in the first lens resin layer 12, a second lens element L2 in the second lens resin layer 13 facing that first lens resin layer 12, and a portion 11p of the substrate 11 disposed between these lens elements L1 and L2 correspond to a single optical lens 4. The optical lens 4 is a compound lens which is square in shape when seen in a plan view obtained through division by dicing the wafer lens 10 at positions of the connecting portions 1c and 2c.

[B: Structure of Molding Die for Transferring Shape]

Figure 3A:
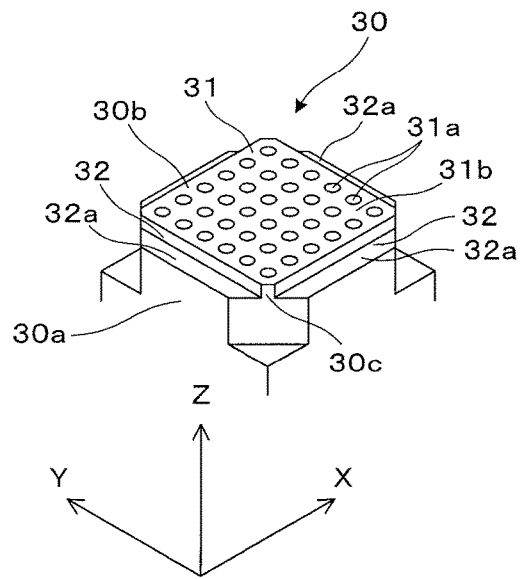
FIG. 3A is a perspective view illustrating a master die used for the production of the wafer lens.

The wafer lens 10 of FIG. 1 is produced by performing three-stage transfer processes using a master die 30 illustrated in FIG. 3A as an original. Hereinafter, structures of the master die 30 and a molding die which includes a resin-made shape transfer surface obtained from the master die 30 will be described.

Figure 3B:
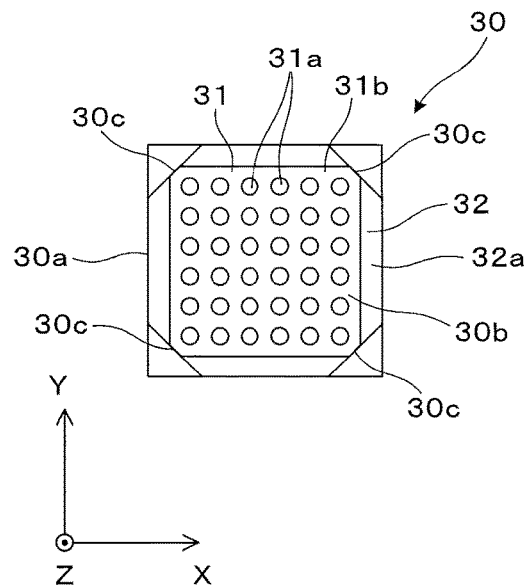
FIG. 3B is a plan view of the master die and FIG. 3C is a perspective view of a sub-master substrate of a sub-master die which is to be produced by the master die.
Figure 4A:
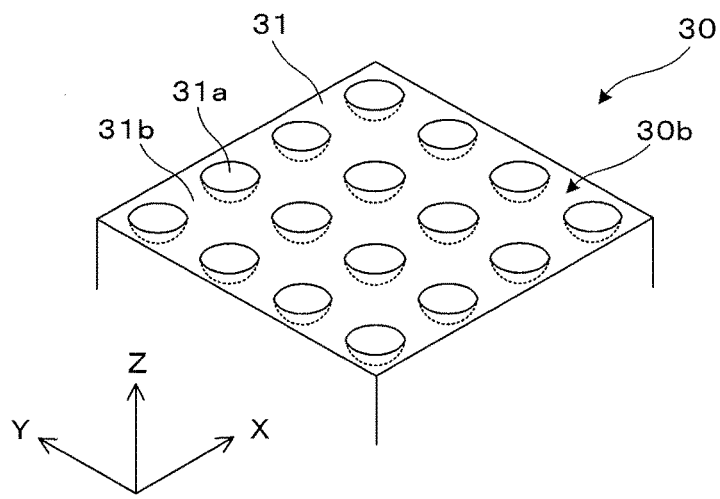
FIG. 4A is a perspective view which explains a cut-out part of the master die.

As illustrated in FIGS. 3A, 3B and 4A, the master die 30 is a rectangular parallelepiped block member which includes, at an end portion 30a thereof, a substantially rectangular end surface 30b and an annular step 32 provided in the periphery of the end surface 30b. The end surface 30b is formed as a first molding surface 31 for forming a second molding surface 43 of a sub-master die 40 of FIG. 4B. The end portion 30a is chamfered at four corners of side surfaces thereof. That is, the end portion 30a includes four small flat surfaces 30c each of which corresponds to a chamfered surface. Each flat surface 30c extends vertically to the end surface 30b from the four corners of the end surface 30b and is tilted at 45 degrees to an X-axis and a Y-axis. These flat surfaces 30c are provided to avoid causing excessive collection of a resin material for transfer outside the four corners of the end surface 30b during the transfer. At the four corners, the resin may overlap in four layers at the maximum, thereby causing the resin layer to be excessively thick. Therefore, such excessive overlapping of the resin is avoided by providing the flat surfaces 30c. A breadth of each flat surface 30c is set to be not less than about one-twentieth times and not greater than about one-third times, and more preferably, not less than about one-fifteenth times and not greater than about one-fifth times of a side of the end surface 30b parallel to the X-axis and the Y-axis, that is, one that is greater in width among two wall surfaces adjacent the flat surface 30c (in the specific example, both the wall surfaces are equal in width: 17 mm).

The master die 30 is repeatedly used for producing the sub-master die 40. The master die 30 may form a sub-master resin layer (a first shape transfer layer) 41 on which units (later-described resin layer portions 41da and 41db of FIG. 8A) which are arranged in an isolated manner on a sub-master substrate 42 are collected by transferring in a step-and-repeat system in which the master die 30 repeats transferring while moving in two dimensions so as to face shallow rectangular recessed portions 42c which are formed uniformly in a matrix pattern or a latticed pattern on the sub-master substrate 42 of FIG. 3C. The first molding surface 31 of the master die 30 has an outer periphery which is one size smaller than the recessed portions 42c and a surface shape corresponding to a partially reversed shape of the first transfer target surface 12a of the first lens resin layer 12 of the wafer lens 10 to be obtained finally. The first molding surface 31 includes a first optical transfer surface 31a for forming the first optical surface OS1 in the first transfer target surface 12a and a flat first flange transfer surface 31b for forming the first flange surface FP1 in the first transfer target surface 12a. Multiple first optical transfer surfaces 31a are disposed, for example, on lattice points at equal intervals, and each of which is formed in a shape to correspond to a shape of a finally obtained optical lens: here, a substantially hemispherical concave shape. The step 32 includes a retreated surface 32a for forming a gap between the retreated surface 32a and a surface around a recessed portion 42c formed in the sub-master substrate 42 when the recessed portion 42c is filled with a resin material. The step 32 is a portion for forming a residual film portion which will be described in detail later in the sub-master resin layer 41 of the sub-master die 40. In order to improve releasability of the molded product, a side surface portion from the retreated surface 32a to the end surface 30b may be tapered, as it nears the end surface 30b, toward the center of the first molding surface 31.

Generally, the master die 30 is made of a metallic material. Examples of the metallic material may include an iron-based material, an iron-based alloy and non-iron-based alloy. Note that the master die 30 may be made of metallic glass or an amorphous alloy. The master die 30 is not limited to those made of a single material: the master die 30 may be formed by plating a suitable base with metallic materials described above.

Figure 4B:
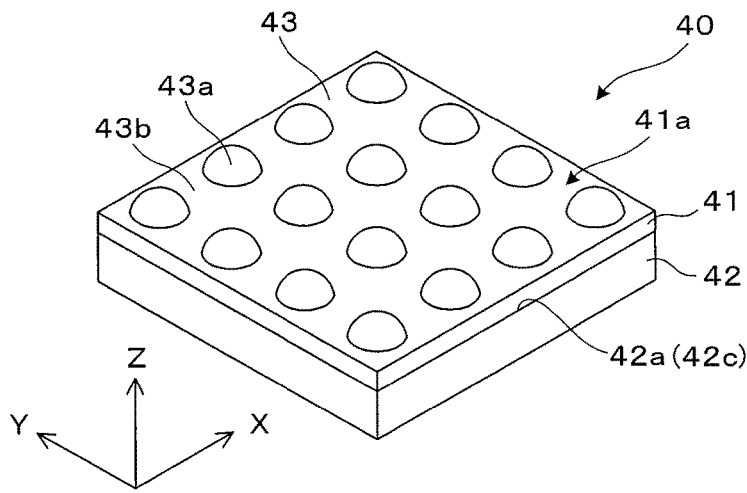
FIG. 4B is a perspective view which explains a cut-out part of the sub-master die.

As illustrated in a partially enlarged manner in FIG. 4B, the sub-master die 40 which is a first molding die includes a sub-master resin layer (the first shape transfer layer) 41 and a sub-master substrate 42. In FIG. 4B, for the ease of understanding, a cut-out part of the sub-master die 40 is illustrated schematically. The sub-master resin layer 41 and the sub-master substrate 42 are in a stacked structure. The sub-master resin layer (the first shape transfer layer) 41 includes, on an end surface 41a thereof, the second molding surface 43 for forming a third molding surface 53 of a sub-sub-master die 50 which will be described later. The second molding surface 43 corresponds to a positive type of the first transfer target surface 12a of the first lens resin layer 12 of the finally obtained wafer lens 10. The second molding surface 43 includes a second optical transfer surface 43a for forming the first optical surface OS1 in the first transfer target surface 12a and a second flange transfer surface 43b for forming the first flange surface FP1 in the first transfer target surface 12a. Multiple second optical transfer surfaces 43a are transferred by the first optical transfer surface 31a and are disposed on lattice points. Each of the second optical transfer surfaces 43a is formed in a substantially hemispherical convex shape.

The sub-master resin layer 41 is made of a first resin material. Examples of the first resin material include a light-curing resin material. A light-curing resin material which becomes epoxy resin, acrylic resin, allyl ester resin, vinyl resin and the like after curing may be used as a material of the first lens resin layer 12 of the wafer lens 10. A desirable first resin material is a resin material which demonstrates favorable releasability after curing, especially a resin material which is sufficiently light transmissive in curing wavelengths and may be released without application of a mold release agent.

Figure 3C:
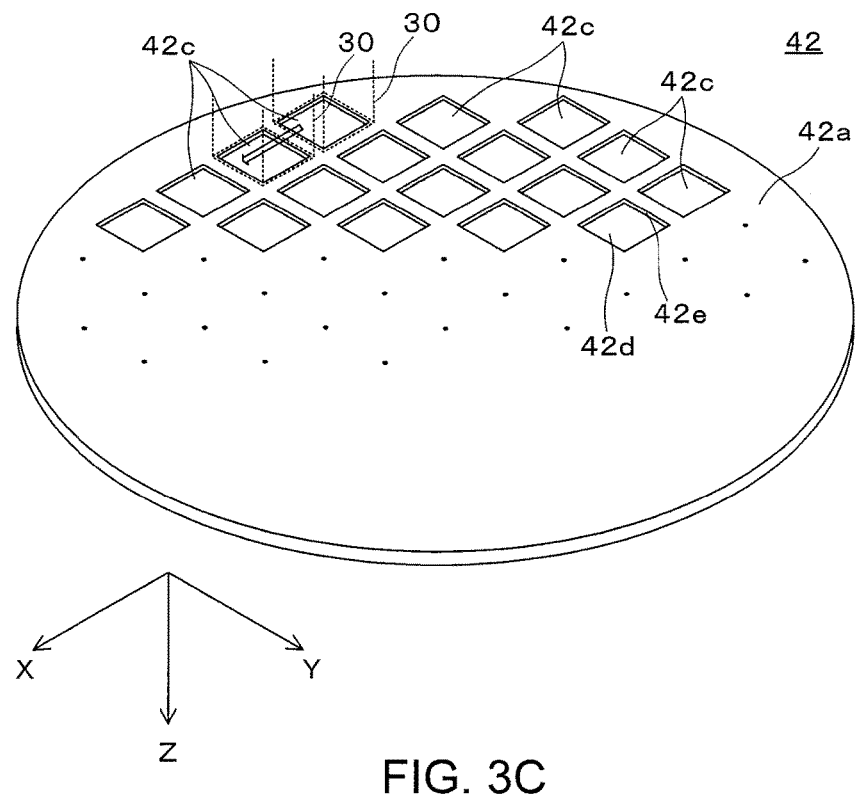

The sub-master substrate 42 is a first substrate made of a light transmissive and sufficiently rigid material. For example, the sub-master substrate 42 is made of glass. On the entire surface 42a of the sub-master substrate (a first substrate) 42, as illustrated in FIG. 3C, multiple shallow rectangular-shaped recessed portions 42c are formed in a matrix pattern. Typically, each recessed portion 42c is a recess of which depth is equal to or smaller than 200 micrometers, which includes a bottom surface 42d and a side surface 42e, and which is closed inside it. The recessed portions 42c prevent the first resin material from becoming excessively thin when transfer is performed with the first resin material being disposed between the end surface 30b of the master die 30 and the surface 42a of the sub-master substrate 42. With this, it is possible to bring the master die 30 close to a suitable position to the surface 42a of the sub-master substrate 42 without pressing the master die 30 against the sub-master substrate 42 with large pressure. The recessed portions 42c may be formed by various methods, such as cutting and etching, to the sub-master substrate 42. The side surface 42e of the recessed portion 42c may be inclined or may be formed as a curved surface so that the area of the opening of the recessed portion 42c decreases as it nears the bottom surface 42d. In this manner, the recessed portion 42c may be formed comparatively easily. Alternatively, the side surface 42e may be inclined (overhung) so that the area of the opening of the recessed portion 42c increases as it nears the bottom surface 42d or the side surface 42e may be roughened. In this manner, unsuccessful release at the time of releasing from the master die 30 may be reduced.

Figure 4C:
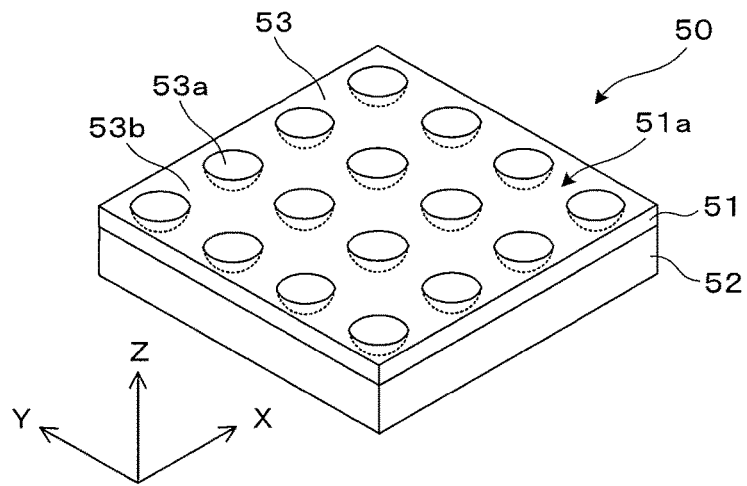
FIG. 4C is a perspective view which explains a cut-out part of a sub-sub-master die.

As illustrated in a partially enlarged manner in FIG. 4C, the sub-sub-master die 50 which is a second molding die include a sub-sub-master resin layer (a second shape transfer layer) 51 and a sub-sub-master substrate 52. In FIG. 4C, for the ease of understanding, a cut-out part of the sub-sub-master die 50 is illustrated schematically. The sub-sub-master resin layer (the second shape transfer layer) 51 and the sub-sub-master substrate 52 are in a stacked structure. The sub-sub-master resin layer (the second shape transfer layer) 51 includes, on an end surface 51a thereof, a third molding surface 53 for forming the first lens resin layer 12 of the wafer lens 10 by transferring. The third molding surface 53 has a shape corresponding to a reversed shape of the first transfer target surface 12a of the first lens resin layer 12 of the wafer lens 10. The third molding surface 53 includes a third optical transfer surface 53a for forming the first optical surface OS1 in the first transfer target surface 12a and a third flange transfer surface 53b for forming a first flange surface FP1 in the first transfer target surface 12a. A plurality of third optical transfer surfaces 53a are transferred by the second optical transfer surface 43a and are disposed in a matrix pattern. Each of the third optical transfer surfaces 53a is formed in a substantially hemispherical concave shape. Note, the sub-sub-master substrate 52 is not formed recess portion and is a flat plate.

The sub-sub-master resin layer 51 is made of a second resin material which is the same as the first resin material of the sub-master resin layer 41. The sub-sub-master substrate 52 as the second substrate is made of a material which is the same as that of the sub-master substrate 42. That is, as the second resin material of the sub-sub-master resin layer 51, a light-curing resin material which becomes epoxy resin, acrylic resin, allyl ester resin, vinyl resin and the like after curing may be used. A desirable second resin material is a resin material which demonstrates favorable releasability after curing, especially a resin material which is sufficiently light transmissive in curing wavelengths and may be released without application of a mold release agent. The sub-sub-master substrate (a second substrate) 52 is made of a light transmissive and sufficiently rigid material. For example, the sub-sub-master substrate 52 is made of glass.

It is not necessary that the sub-master resin layer 41 and the sub-sub-master resin layer 51 are made of the same material: these layers may be made of different types of light-curing resin. Further, it is not necessary that the sub-master substrate 42 and the sub-sub-master substrate 52 are made of the same material: these substrates may be made of different materials.

In the above, mold releasing layers may be formed through, for example, application of a mold release agent on a surface of the master die 30, the sub-master die 40 and the sub-sub-master die 50 to facilitate releasing of a molded product.

[C: Production Apparatus of Sub-Master Die and the Like]

Hereinafter, production apparatus for producing the sub-master die 40 and the like illustrated in FIG. 4B will be described with reference to FIG. 5.

Figure 5:
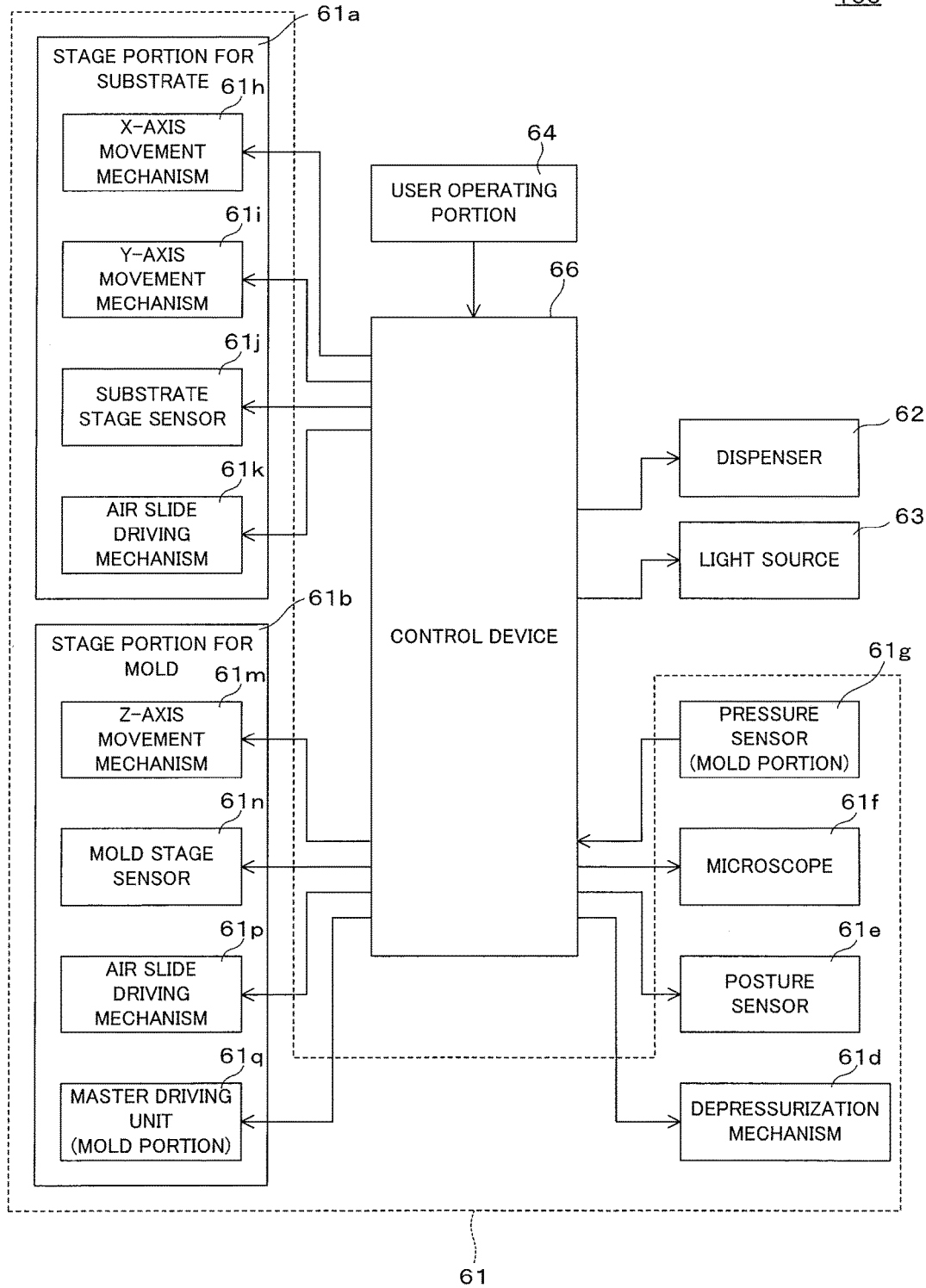
FIG. 5 is a block diagram illustrating, in circuit, production apparatus for producing, for example, the sub-master die.

As illustrated in FIG. 5, a production device 100 includes an alignment driving unit 61, a dispenser 62, a light source 63, a user operating portion 64 and a control device 66.

Here, the alignment driving unit 61 is used for disposing, in a precisely aligned manner, the master die 30 illustrated in FIG. 3A with respect to each of the recessed portions 42c provided in the sub-master substrate 42 illustrated in FIG. 3C. The alignment driving unit 61 includes: a stage portion for substrate 61a for supporting the sub-master substrate 42; a stage portion for mold 61b for supporting the master die 30; a depressurization mechanism 61d for depressurizing the peripheries of the master die 30 and the sub-master substrate 42; a posture sensor 61e for detecting a posture and the like of the master die 30; a microscope 61f for observing alignment conditions; and a pressure sensor 61g for detecting pushing pressure of the master die 30 against the sub-master substrate 42.

Among these, the stage portion for substrate 61a includes: an X-axis movement mechanism 61h for moving the sub-master substrate 42 fixed on a support portion for substrate (not illustrated) provided in the stage portion for substrate 61a to a desired position in an X-axis direction; a Y-axis movement mechanism 61i for moving the sub-master substrate 42 to a desired position in a y-axis direction; a substrate stage sensor 61j for detecting position information about the X-axis and the Y-axis of the sub-master substrate 42 placed on the support portion for substrate described above, and transmitting the detected position information to the control device 66; and an air slide mechanism 61k for enabling smooth movements of the axis movement mechanisms 61h, 61i and the like. The stage portion for mold 61b includes: a Z-axis movement mechanism 61m for moving the master die 30 fixed on a support portion for mold (not illustrated) provided on the stage portion for mold 61b to a desired position in a Z-axis direction; a mold stage sensor 61n for detecting position information about the Z-axis of the master die 30 fixed to the support portion for mold described above, and transmitting the detected position information to the control device 66; an air slide mechanism 61p for enabling smooth movements of the Z-axis movement mechanism 61m and the like; and a master driving unit 61q for adjusting an inclination and a rotational posture of the master die 30 and, at the same time, urging the master die 30 upward.

In the alignment driving unit 61, the posture sensor 61e detects information about an inclination of an upper surface of the master die 30, and the like, and outputs the detected information to the control device 66. The microscope 61f detects a plurality of alignment marks formed on the upper surface of the master die 30 and outputs the detected alignment marks to the control device 66 as the position information.

The dispenser 62 has a role to supply the first resin material consisting of a light-curing resin material onto the master die 30 in order to form the sub-master resin layer 41 on the sub-master substrate 42 illustrated in FIG. 3C. The light source 63 generates light of a wavelength for curing the resin material toward the first resin material disposed between the master die 30 and the sub-master substrate 42. The light source 63 is, for example, a UV light source. By the light illuminated from the light source 63, the cured sub-master resin layer 41 is formed on the sub-master substrate 42.

The user operating portion 64 receives information necessary for an operation of the production device 100 input in accordance with operations of a keyboard, a mouse and the like (not illustrated) by a user. For example, information about the size, the arrangement and the like of the recessed portion 42c of the sub-master substrate 42, and information about the size and the like of the master die 30 are input in the control device 66 by the user.

The control device 66 is a unit which collectively controls operations of each part of the alignment driving unit 61, the dispenser 62, the light source 63 and the like described above for the production of the sub-master die 40 and the like. The control device 66 causes the master die 30 to move in three dimensions with respect to the sub-master substrate 42 by suitably moving the stage portion for substrate 61a and the stage portion for mold 61b so that the first molding surface 31 of the master die 30 is disposed to face a desired area (specifically, the recessed portion 42c) on a surface 42a of the sub-master substrate 42. At this time, the control device 66 precisely adjusts the position, together with the rotation angle, of the master die 30 with respect to the sub-master substrate 42 in accordance with the position information detected using the axis movement mechanisms 61h, 61i and 61m and the microscope 61f. Further, the control device 66 causes the master driving unit 61q to operate so as to precisely adjust, for example, the inclination of the master die 30 with respect to the sub-master substrate 42. Further, the control device 66 has a role to press the first molding surface 31 of the master die 30 with desired pressure against the sub-master substrate 42 by causing the master driving unit 61q to operate. The control device 66 described above may set and implement, for example, a procedure regarding the order in which the resin layer portions (resin replica portions) 41da and 41db (see FIG. 7B and other figures) are formed with respect to the recessed portions 42c which are arranged in a matrix pattern on the sub-master resin layer 41.

[D: Production Process of Wafer Lens]

With reference to FIGS. 6A to 6C, 7A to 7C, 8A to 8D, 9A to 9C, 10 and other figures, an outline of a production process of the wafer lens 10 performed using the master die 30, the sub-master die (a second molding die) 40 and the sub-sub-master die (a third molding die) 50 described above will be described. Although molding of the first lens resin layer 12 will be described below, the same process will be performed for the molding of the second lens resin layer 13.

Figure 10:
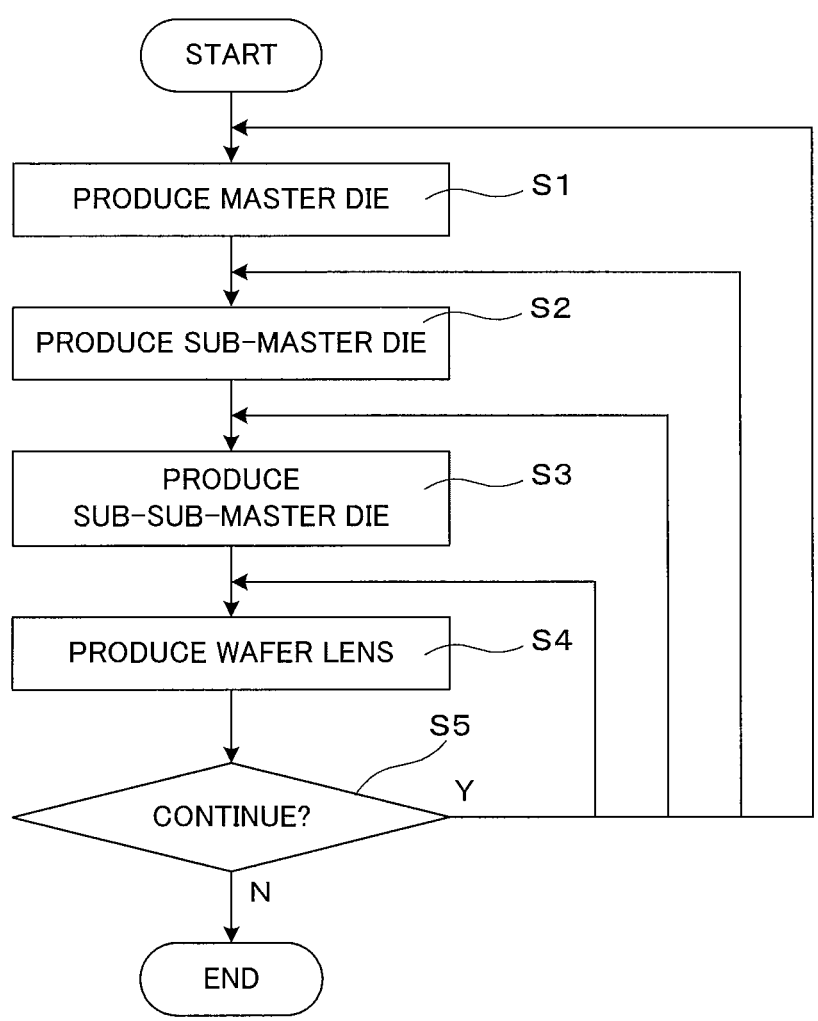
FIG. 10 is a flowchart which conceptually describes the production process of the wafer lens.

First, the master die 30 corresponding to a negative type of each array unit AU which constitutes the first lens resin layer 12 of the wafer lens 10 is produced by, for example, grinding (see step S1 of FIG. 10).

Next, first-stage resin replica portions, i.e., first-stage resin layer portions 41da, are formed at predetermined positions on the sub-master substrate 42 using the master die 30 (a first process).

Figure 6A:
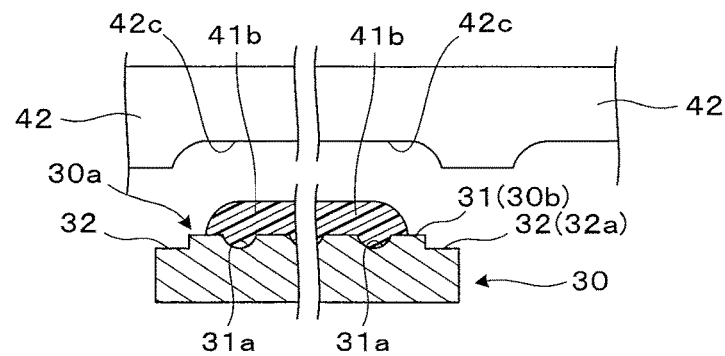
FIGS. 6A to 6C are diagrams for describing a production process of the wafer lens.
Figure 6B:
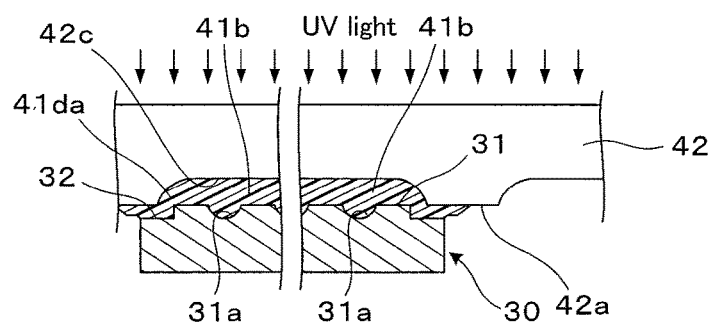
Figure 6C:
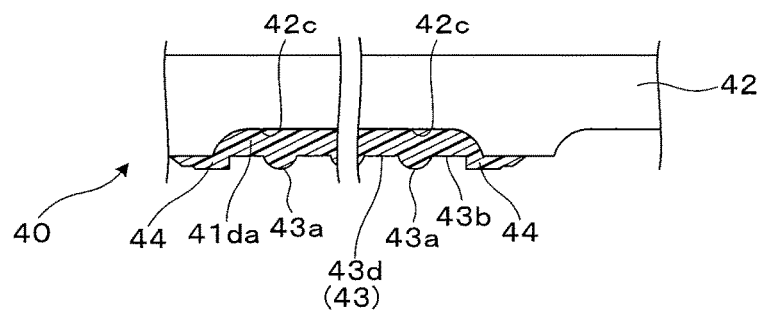

In particular, as illustrated in FIG. 6A, a first resin material 41b is disposed on the first molding surface 31 of the master die 30 using the production device 100 illustrated in FIG. 5 and other figures. Then, as illustrated in FIG. 6B, the end surface 30b of the master die 30, i.e., the first molding surface 31, is aligned and disposed to face a particular recessed portion 42c formed on the surface 42a of the sub-master substrate 42 using the production device 100 illustrated in FIG. 5 and other figures. Then the master die 30 is pressed from the lower direction of the sub-master substrate 42 so that the first molding surface 31 and the recessed portion 42c are brought close to a suitable distance. Here, the first resin material 41b is pressed by the master die 30 and the recessed portion 42c and a facing portion between the retreated surface 32a of the step 32 of the master die 30 and the sub-master substrate 42 are filled with the first resin material 41b. In this state, light of predetermined wavelength, such as the UV light, is emitted from the light source 63 and the first resin material 41b disposed therebetween is cured. Therefore, the first-stage resin layer portions (a first-stage resin replica portions) 41da to which the first molding surface 31 of the master die 30 has been transferred and which is constituted by cured resin are formed. Next, as illustrated in FIG. 6C, the first-stage resin layer portion 41da and the sub-master substrate 42 are collectively released from the master die 30. In this manner, the first-stage resin layer portion 41da is exposed in a rectangular area which includes the recessed portion 42c facing the end surface 30b of the master die 30, i.e., the first molding surface 31.

The first-stage resin layer portion (the first-stage resin replica portion) 41da formed in the above-described cycle includes, as a transferred product of the step 32 of the master die 30, a residual film portion 44 having the thickness of, for example, about 60 micrometers around a main part having the thickness of, for example, about 100 micrometers. The first-stage resin layer portion (the first-stage resin replica portion) 41da includes, as a surface thereof, a transfer surface element 43d which constitutes a part of the second molding surface 43. If n first optical transfer surfaces 31a are formed on the first molding surface 31 of the master die 30, the transfer surface element 43d includes n second optical transfer surfaces 43a corresponding thereto.

Next, returning to FIG. 6A, the first resin material 41b is disposed again on the first molding surface 31 of the master die 30. Then, as illustrated in FIG. 6B, the end surface 30a of the master die 30 is aligned and disposed to face a subsequent recessed portion 42c formed on the surface 42a of the sub-master substrate 42. Then the master die 30 is pressed from the lower direction of the sub-master substrate 42 so that the first molding surface 31 and the recessed portion 42c are brought close to a suitable distance. Although details will be described below, the recessed portion 42c, which is a current molding portion, is not situated adjacent to a previously molded recessed portion 42c but is separated therefrom. In this state, light of predetermined wavelength, such as the UV light, is emitted from the light source 63 and the first resin material 41b disposed therebetween is cured. Therefore, the first molding surface 31 of the master die 30 is transferred to the first resin material 41b and the first-stage resin layer portion (the first-stage resin replica portion) 41da is formed. Next, as illustrated in FIG. 6C, the first-stage resin layer portion 41da and the sub-master substrate 42 are collectively released from the master die 30. The first-stage resin layer portion (the first-stage resin replica portion) 41da obtained in the above-described cycle includes, as a transferred product of the step 32 of the master die 30, the residual film portion 44 around the main part. The first-stage resin layer portion (the first-stage resin replica portion) 41da includes, as a surface thereof, the transfer surface element 43d which constitutes a part of the second molding surface 43.

By repeating the cycle or the process illustrated in FIGS. 6A to 6C, the first-stage resin layer portions 41da are formed at the recessed portions 42c at alternate arrangement positions corresponding to one of alternate positions of a checkerboard pattern among all the recessed portions 42c formed on the sub-master substrate 42.

Figure 11A:
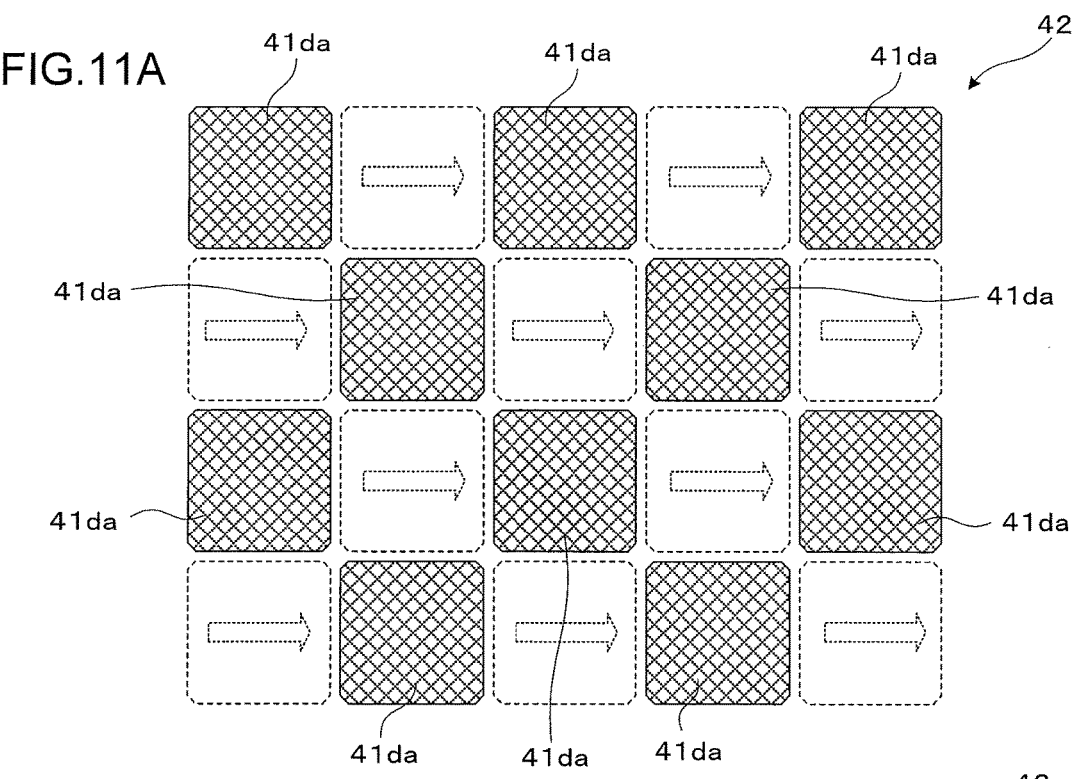
FIGS. 11A and 11B are diagrams explaining the order in which resin layer portions are formed on the sub-master substrate.

FIG. 11A is a plan view explaining positions in which, in the sub-master substrate 42 illustrated in FIG. 3C, the first-stage resin layer portions (the first-stage resin replica portions) 41da illustrated in FIG. 6C are to be formed. In the first half of the entire process of forming the sub-master resin layer 41 which covers the entire sub-master substrate 42 of the sub-master die 40 illustrated in FIG. 4B, the first-stage resin layer portions 41da are formed at one of alternate positions, i.e., isolated positions which are not in line contact with their peripheries, of the checkerboard pattern of the sub-master substrate 42. That is, the first-stage resin layer portions 41da are not formed sequentially from a corner on the sub-master substrate 42 but are disposed in a hound's tooth pattern with a space formed therebetween. The order in which the first-stage resin layer portions 41da are formed is not limited to that in which, as illustrated by arrows in the drawing, the positions at which the first-stage resin layer portions 41da are formed are moved at a time in one direction as a single group constituting each row. However, for example, the first-stage resin layer portions 41da may be formed randomly.

Next, second-stage resin replica portions, i.e., second-stage resin layer portions 41db are formed at the rest of the portions on the sub-master substrate 42 using the master die 30 (a second process).

Figure 11B:
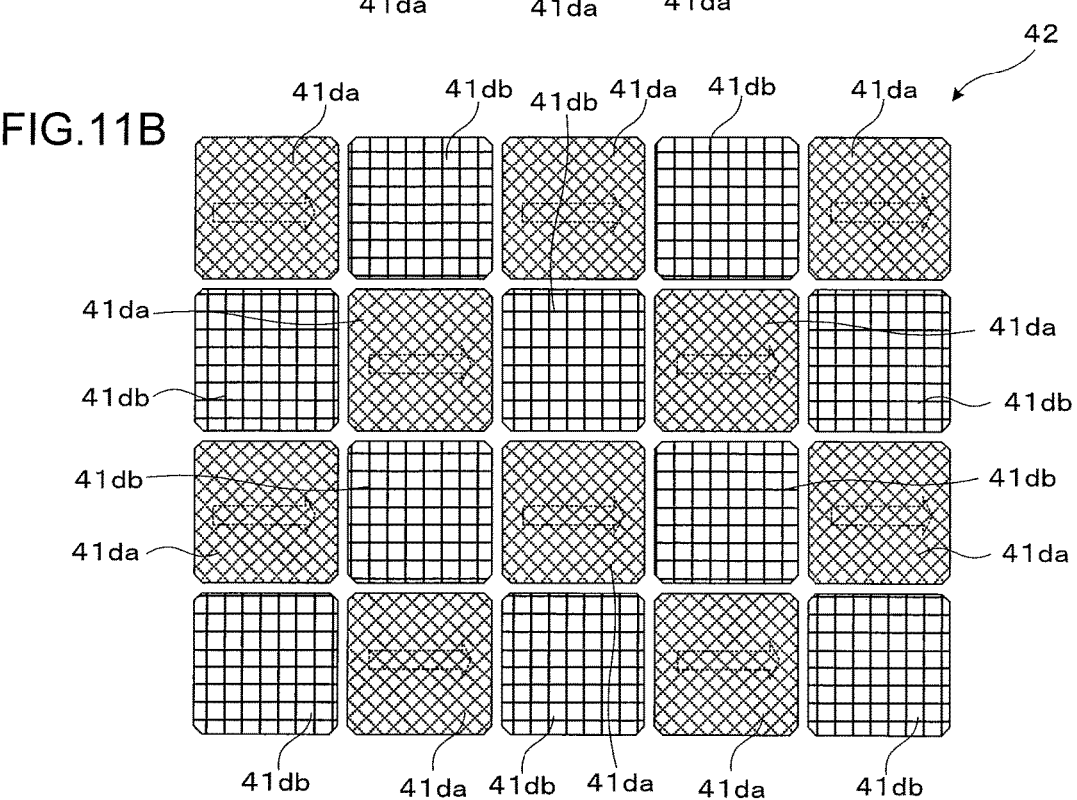

FIG. 11B is a plan view explaining positions at which the second-stage resin layer portions (second-stage resin replica portions) 41db are to be formed on the sub-master substrate 42 illustrated in FIG. 3C. In the second half process of forming the sub-master resin layer 41 which covers the entire sub-master substrate 42 of the sub-master die 40 illustrated in FIG. 4B, the second-stage resin layer portions 41db are formed at the other of alternate positions, i.e., positions surrounded by the first-stage resin layer portions 41da, of the checkerboard pattern, on the sub-master substrate 42. Therefore, the second-stage resin layer portions 41db are disposed in a staggered pattern so as to fill the spaces. The order in which the second-stage resin layer portions 41*db* are formed is not limited to that in which, as illustrated by arrows in the drawing, the positions at which the second-stage resin layer portions 41*db* are formed are moved at a time in one direction as a unit of each row. However, for example, the second-stage resin layer portions 41*db* may be formed randomly.

Figure 7A:
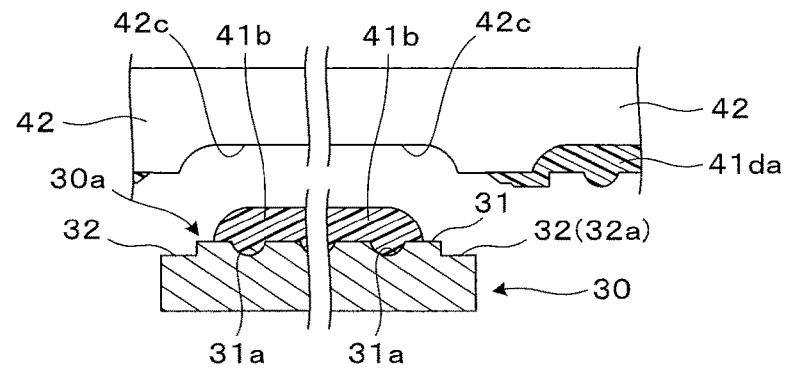
FIGS. 7A to 7C are diagrams for describing a production process of the wafer lens.
Figure 7B:
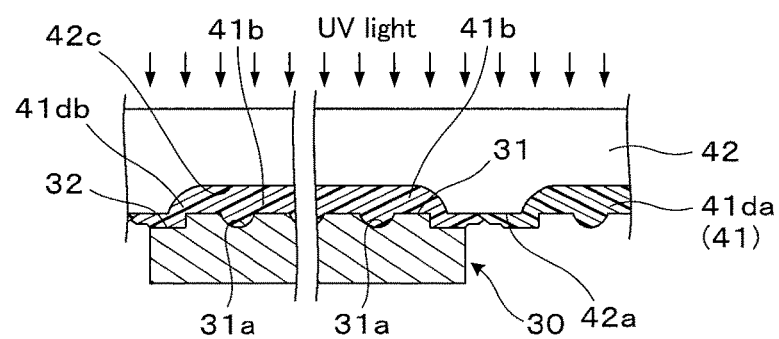
Figure 7C:
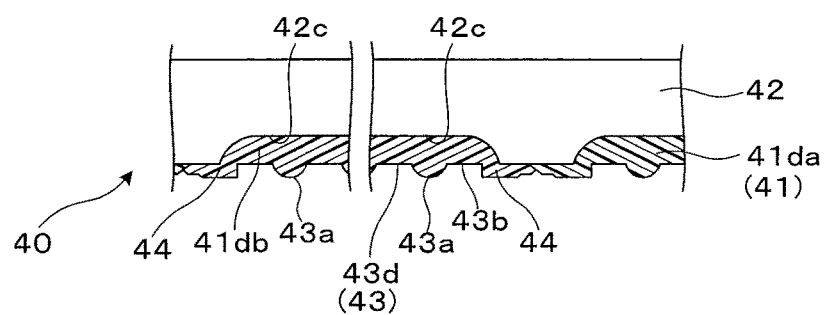

Formation of the second-stage resin layer portions 41*db* will be described in detail. First, as illustrated in FIG. 7A, the first resin material 41*b* is disposed on the first molding surface 31 of the master die 30. Then, as illustrated in FIG. 7B, the first molding surface 31 of the master die 30 is aligned and disposed to face an unprocessed recessed portion 42*c* remaining on the surface 42*a* of the sub-master substrate 42. Then the master die 30 is pressed from the lower direction of the sub-master substrate 42 so that the first molding surface 31 and the recessed portion 42*c* are brought close to a suitable distance. In this state, light of predetermined wavelength, such as the UV light, is emitted from the light source 63 and the first resin material 41*b* disposed therebetween is cured. Therefore, the first molding surface 31 of the master die 30 is transferred to the first resin material 41*b* and the second-stage resin layer portion (the second-stage resin replica portion) 41*db* is formed. Next, as illustrated in FIG. 7C, the second-stage resin layer portion 41*db* and the sub-master substrate 42 are collectively released from the master die 30. The second-stage resin layer portion (the second-stage resin replica portion) 41*db* obtained in the above-described cycle includes, as a transferred product of the step 32 of the master die 30, the residual film portion 44 around the main part. The second-stage resin layer portion (the second-stage resin replica portion) 41*db* includes, as a surface thereof, the transfer surface element 43*d* which constitutes a part of the second molding surface 43.

Figure 12:
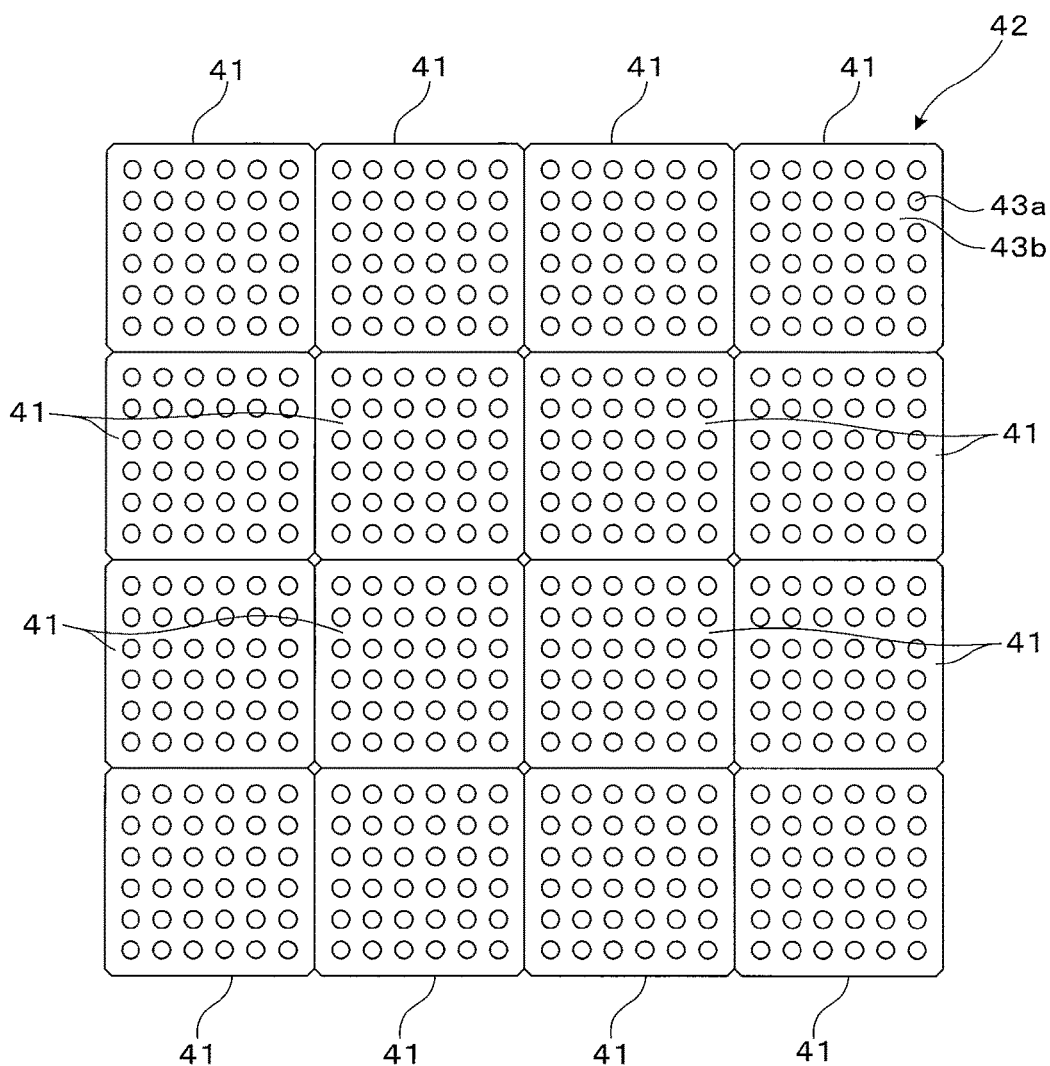
FIG. 12 is an enlarged plan view illustrating a part of a sub-master resin layer constituted by the resin layer portions formed on the sub-master substrate.

By repeating the process illustrated in FIGS. 7A to 7C described above, the second-stage resin layer portions 41*db* are sequentially formed at alternate arrangement positions corresponding to the other of alternate positions of the checkerboard pattern among all the recessed portions 42*c* formed on the sub-master substrate 42. Therefore, the first-stage resin layer portions 41*da* or the second-stage resin layer portions 41*db* are formed corresponding to all the recessed portions 42*c* arranged in a matrix pattern on the sub-master substrate 42. In this manner, as illustrated in FIG. 12, a product in which the first-stage resin layer portion 41*da* and the second-stage resin layer portion 41*db* are arranged in a checkerboard or tile pattern is obtained. That is, the sub-master resin layer 41, as a total combination of the first-stage resin layer portion 41*da* and the second-stage resin layer portion 41*db*, is formed to cover the surface 42*a* of the sub-master substrate 42 with substantially no space, and the sub-master die 40 is completed (see step S2 of FIG. 10). If m recessed portions 42*c* have been formed on the sub-master substrate 42, the obtained sub-master resin layer 41 includes m resin layer portions 41*da* and 41*db* corresponding thereto. That is, n×m second optical transfer surfaces 43*a* have been formed on the sub-master die 40.

Figure 13A:
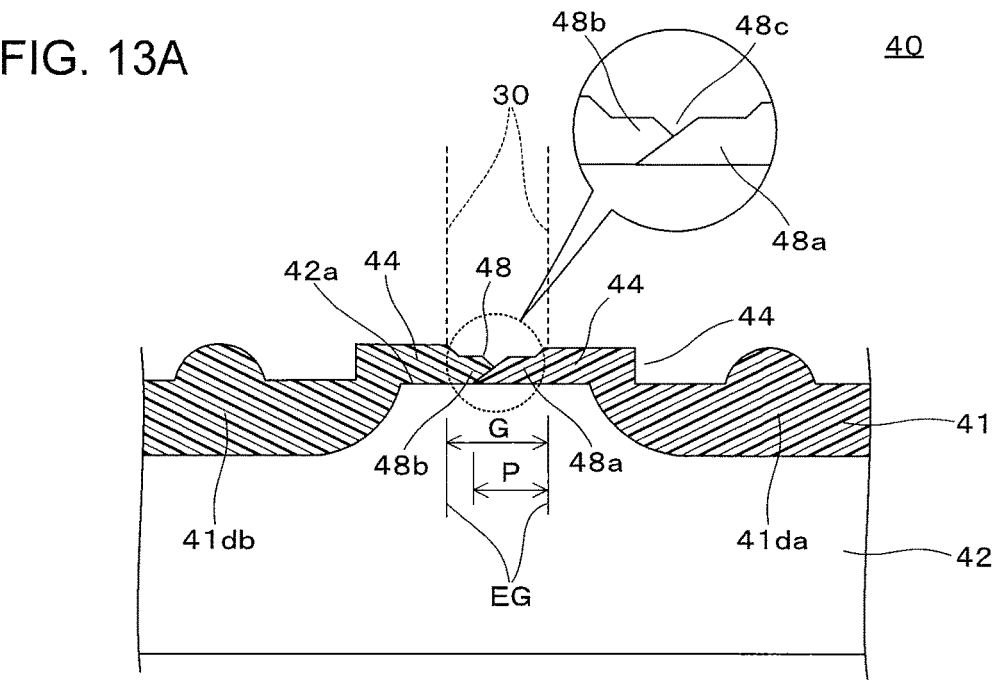
FIGS. 13A and 13B are diagrams explaining a lateral cross-sectional shape of a joint portion which connects a first-stage resin layer portion and a second-stage resin layer portion.

FIG. 13A is an enlarged cross-sectional view explaining a boundary portion between the first-stage resin layer portion 41*da* formed in the first half of the process illustrated in FIGS. 6A to 6C and the second-stage resin layer portion 41*db* formed in the second half of the process illustrated in FIGS. 7A to 7C. A joint portion 48 is formed between the residual film portion 44 formed in the periphery of the first-stage resin layer portion 41*da* and the adjoining residual film portion 44 formed in the periphery of the second-stage resin layer portion 41*db*. The joint portion 48 connects these resin layer portions 41*da* and 41*db* with a thickness of not greater than the thickness of the residual film portion 44. With this joint portion 48, exposure of the sub-master substrate 42 can be avoided and, therefore, adhesion of the sub-master resin layer 41 can be increased.

When the joint portion 48 described above is formed, a resin amount of the first resin material 41*b* becomes relatively large. Therefore, a situation in which the resin material 41*b* with which the recessed portion 42*c* of the sub-master substrate 42 is to be filled runs short can be avoided. Therefore, if the resin material runs short, occurrence of abnormal shapes, such as a projection, caused by shortage of the resin material during the molding the sub-sub-master die 50 in next process can be avoided. Note that such abnormal shapes may cause excessively large height difference of the sub-sub-master resin layer 51 during the molding of the sub-sub-master die 50. With the abnormal shapes, there is a possibility that the thickness of the first lens resin layer 12 of the wafer lens 10 becomes excessively large, or that the accuracy in thickness of the first lens resin layer 12 of the wafer lens 10 is reduced. Formation of unintended abnormal shapes may increase mold release resistance and may cause unsuccessful mold release In order to form the joint portion 48, the resin amount of the first resin material 41*b* for forming the first-stage resin layer portion (the first-stage resin replica portion) 41*da* is defined so that the first resin material 41*b* protrudes suitably outside from a reference line EG which corresponds to a side surface of the master die 30 during the transfer. Further, the resin amount of the first resin material 41*b* for forming the second-stage resin layer portion (the second-stage resin replica portion) 41*db* is also defined so that the first resin material 41*b* protrudes suitably outside from the reference line EG which corresponds to the side surface of the master die 30 during the transfer. In a specific example of production, a protruding width P of the first resin material 41*b* is set to be about 0.5 G or greater and smaller than 1 G with a distance of the master die 30 during the formation of the adjoining first-stage resin layer portion 41*da* and the second-stage resin layer portion 41*db* being set to G. Note that the amount of the first resin material 41*b* protruding outside the reference line EG is not able to be precisely controlled, but the protruding amount of the first resin material 41*b* may be adjusted with a certain degree of accuracy by adjusting a size and a volume of the recessed portion 42*c*, a distance between the master die 30 and the sub-master substrate 42, and the like.

Further, in the case of the sub-master die 40 in the present embodiment, the joint portion 48 is constituted by a first portion 48*a* extending from the residual film portion 44 of the first-stage resin layer portion 41*da* and a second portion 48*b* extending from the residual film portion 44 of the second-stage resin layer portion 41*db*. In the illustrated example, the first portion 48*a* and the second portion 48*b* overlap each other and a shallow recess 48*c* is formed in the joint portion 48. This shallow recess 48*c* is formed in a forward tapered shape, i.e., a shape of a mortar. At this time, an end of the first portion 48*a* formed previously is disposed closer to the sub-master substrate 42 and an end of the second portion 48*b* formed subsequently is disposed further away from the sub-master substrate 42.

Figure 13B:
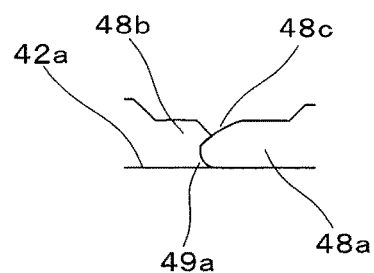

Thus, by causing the first portion 48*a* formed previously and the second portion 48*b* formed subsequently to overlap each other in the depth direction, formation of inversely tapered portion having an undercut shape or an overhang shape in the joint portion 48 can be avoided. That is, as illustrated in FIG. 13B, even if an inversely tapered portion 49a is formed at the surrounding first portion 48a due to surface tension during formation of the first-stage resin layer portion 41da, the second portion 48b formed in the periphery thereof acts to infill the inversely tapered portion 49a of the facing first portion 48a during formation of the second-stage resin layer portion 41db. That is, an increase in mold release resistance caused by the inversely tapered portion 49a can be avoided.

In the description above, the resin amount for forming the first-stage resin layer portion (the first-stage resin replica portion) 41da is defined to be not less than the resin amount for forming the second-stage resin layer portion (the second-stage resin replica portion) 41db. Although it is possible to define both resin amounts to be substantially the same in order to connect the first-stage resin layer portion 41da and the second-stage resin layer portion 41db, by defining the resin amount for forming the second-stage resin layer portion 41db to be relatively thin, the shallow recess 48c can be easily formed in an upper portion of the joint portion 48 while infilling the inversely tapered portion 49a by the overlapped resin in the joint portion 48. Therefore, the thickness of the sub-master resin layer 41 can be relatively small, whereby an increase in mold release resistance can be avoided. Further, since a main purpose of increasing the resin amount for the first-stage resin layer portion 41da to be greater than the resin amount for the second-stage resin layer portion 41db is to prevent a height of the joint portion 48 from becoming greater than a height of the residual film portion 44, in this case, it is necessary to control a ratio of the resin amount for the first-stage resin layer portion 41da to the resin amount for the second-stage resin layer portion 41db not to be excessively high. In the specific example, the ratio between the resin amount for forming the first-stage resin layer portion 41da and the resin amount for forming the second-stage resin layer portion 41db is defined such that, for example, a value (a resin amount ratio) of [the resin amount of the first-stage resin layer portion 41da]/[the resin amount of the second-stage resin layer portion 41db] is not less than 1.05 and not greater than 2.00, more preferably, not less than 1.05 and not greater than 1.80, and even more preferably, not less than 1.05 and not greater than 1.50. If the resin amount for forming the second-stage resin layer portion (the second-stage resin replica portion) 41db is defined greater than the resin amount for forming the first-stage resin layer portion (the first-stage resin replica portion) 41da, a possibility that a projection is formed in the upper portion of the joint portion 48 becomes high and it becomes less easy to reduce the thickness of the sub-master resin layer 41. Therefore, there may be a tendency that mold release resistance increases.

Figure 8A:
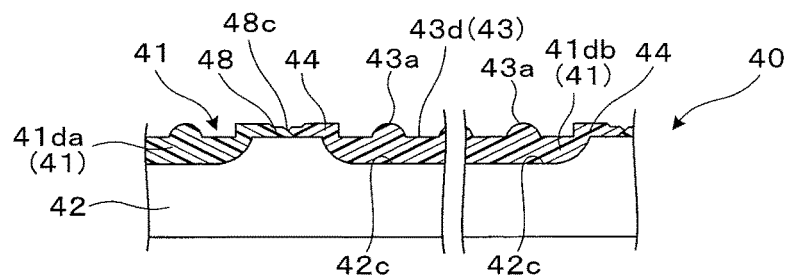
FIGS. 8A to 8D are diagrams for describing a production process of the wafer lens.

As illustrated in FIG. 8A, the sub-master die 40 with good transfer property and mold-release property is prepared through the above-described process.

Figure 8B:
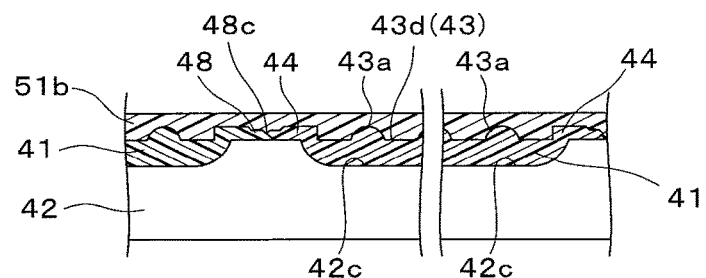
Figure 8C:
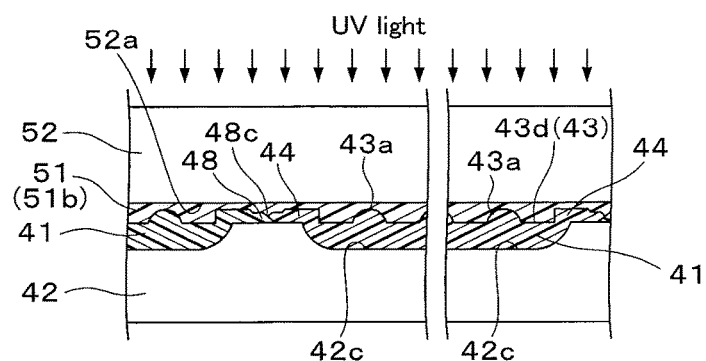

Next, as illustrated in FIG. 8B, a second resin material 51b is disposed in a broad area on the second molding surface 43 of the sub-master die 40 using machining apparatus which is the same as the production device 100 illustrated in FIG. 5 and other figures. Then, as illustrated in FIG. 8C, using machining apparatus which is the same as the production device 100 illustrated in FIG. 5 and other figures, the sub-master die 40 is pressed from the lower direction of the sub-sub-master substrate 52 so that the second molding surface 43 and a surface 52a of the sub-sub-master substrate 52 are moved close to a suitable distance. In this state, light of predetermined wavelength, such as the UV light, is emitted from the light source and the second resin material 51b disposed therebetween is cured. Therefore, the sub-sub-master resin layer 51 to which the second molding surface 43 of the sub-master die 40 is transferred and which is constituted by cured resin is formed. That is, the third molding surface 53 (the third optical transfer surface 53a and the third flange transfer surface 53b illustrated in FIG. 4C are included) is formed on the sub-sub-master resin layer 51. Although the light is illuminated from the side of the sub-sub-master substrate 52 in the present embodiment, the light may be illuminated from the side of the sub-master die 40 or both from the side of the sub-sub-master substrate 52 and from the side of the sub-master die 40.

Figure 8D:
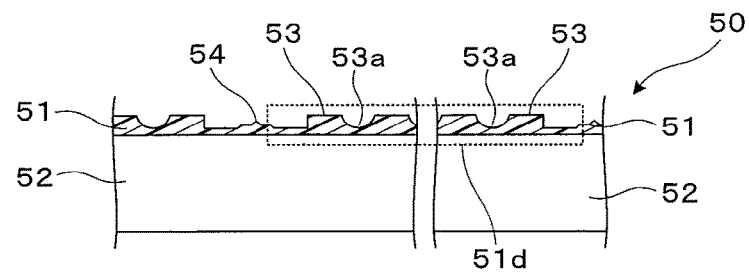

Next, as illustrated in FIG. 8D, the sub-sub-master resin layer 51 and the sub-sub-master substrate 52 are collectively released from the sub-master die 40, and thus the independent sub-sub-master die 50 is completed (see step S3 of FIG. 10). The sub-sub-master resin layer 51 of the sub-sub-master die 50 is divided into multiple resin layer portions 51d corresponding to the resin layer portions 41da and 41db of the sub-master die 40, and these resin layer portions 51d are arranged in a matrix pattern. A low projecting portion 54 which corresponds to the recess 48c of the joint portion 48 between the residual film portions 44 of the sub-master die 40 is formed in the outside of each resin layer portion 51d. The projecting portion 54 extends in the shape of a lattice pattern on the surface of the sub-sub-master die 50.

Figure 9A:
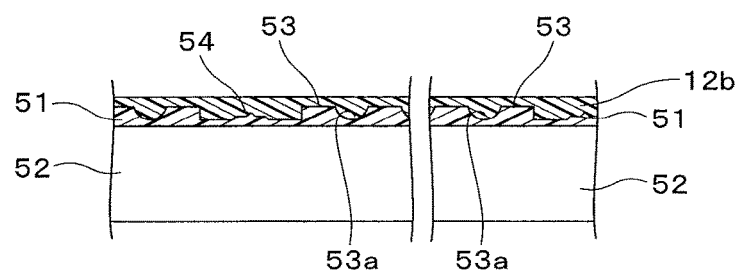
FIGS. 9A to 9C are diagrams for describing a production process of the wafer lens.
Figure 9B:
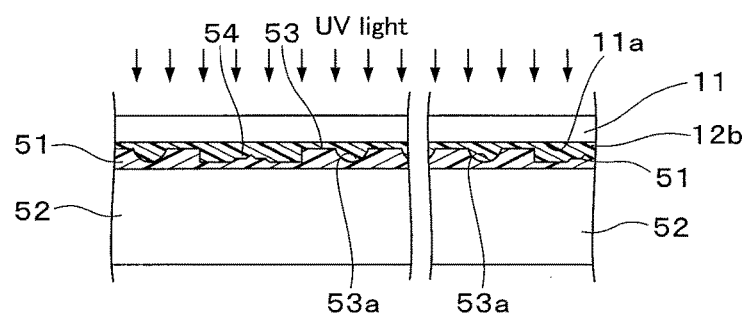

Next, production of the wafer lens 10 is started. As illustrated in FIG. 9A, a third resin material 12b (a light-curing resin material for forming the first lens resin layer 12) is disposed in a broad area on the third molding surface 53 of the sub-sub-master die 50 using machining apparatus which is the same as the production device 100 illustrated in FIG. 5 and other figures. Then, as illustrated in FIG. 9B, using machining apparatus which is the same as the production device 100 illustrated in FIG. 5 and other figures, the sub-sub-master die 50 is pressed from the lower direction of the substrate 11 so that the third molding surface 53 and a surface of the substrate 11 are moved close to a suitable distance. In this state, light of predetermined wavelength, such as the UV light, is emitted from the light source and the third resin material 12b disposed therebetween is cured. Therefore, the first lens resin layer 12 to which the third molding surface 53 of the sub-sub-master die 50 is transferred and which is constituted by the cured resin is formed. That is, the first transfer target surface 12a (the first optical surface OS1 and the first flange surface FP1 illustrated in FIG. 1 are included) is formed on the first lens resin layer 12. Although the light is illuminated from the side of the substrate 11 in the present embodiment, the light may be illuminated from the side of the sub-sub-master substrate 52 or both from the side of the substrate 11 and from the side of the sub-sub-master substrate 52.

Figure 9C:
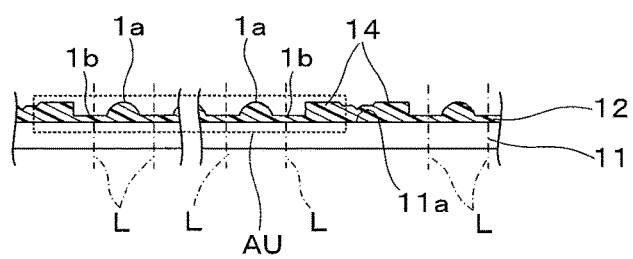

Then, as illustrated in FIG. 9C, the first lens resin layer 12 and the substrate 11 are collectively released from the sub-sub-master die 50. If the second lens resin layer 13 has already been formed, the wafer lens 10 is completed (see step S4 of FIG. 10). If the second lens resin layer 13 has not been formed, the second lens resin layer 13 made of a fourth resin material is formed by performing the same process as that in the first lens resin layer 12 and, the wafer lens 10 is completed by collectively releasing the second lens resin layer 13 and the substrate 11 from the sub-sub-master die 50 for the second lens resin layer 13 (see step S4 of FIG. 10). Note that the process for forming the second lens resin layer 13 may be started before the sub-sub-master die 50 is released to obtain the first lens resin layer 12. By starting the molding on the other surface of the substrate 11 in a state in which the molding die is left on one surface of the substrate 11, occurrence of warpage in the molded produce is reduced easily.

The first lens resin layer 12 of the wafer lens 10 produced as above is divided into multiple array units AU arranged in a matrix pattern corresponding to the resin layer portions 51d of the sub-sub-master die 50. A low projection 14 is formed at an outer edge of each array unit AU to correspond to a recess adjoining to the projecting portion 54 formed in the sub-sub-master resin layer 51 of the sub-sub-master die 50, i.e., the residual film portion 44 of the sub-master die 40.

A plurality of types of wafer lenses 10 are produced in, for example, the same process as that described above and are stacked suitably, and then, cut along dicing lines L into square prism-like shape by dicing with the first lens body 1a and the like being the center. In this manner, a plurality of divided compound lenses, i.e., the optical lenses 4 (for FIG. 2, a single compound lens), are completed.

The master die 30, the sub-master die 40 and the sub-sub-master die 50 described above are used a plurality of times (see step S5 of FIG. 10). That is, when these molds 30, 40 and 50 deteriorated and need to be replaced or changed, steps S1 to S4 of FIG. 10 are performed to the suitable upper limit times while replacing any of the master die 30, the sub-master die 40 and the sub-sub-master die 50 with new one or another one reused. For example, i array units AU are formed when the master die 30 is transferred i times. That is, a single sub-master die 40 in which i array units AU have been formed may be obtained. Further, j sub-sub-master dies 50 may be obtained when the sub-master die 40 is transferred j times. k wafer lenses 10 may be obtained when the sub-sub-master dies 50 are transferred k times. Therefore, a total of j×k wafer lenses 10 may be obtained when the sub-sub-master die 50 is transferred k times with respect to each of the j sub-master dies 40. If the master die 30 has n optical transfer surfaces, n×i×j×k optical lenses 4 may be obtained.

According to the production method for the present embodiment, the first-stage resin layer portions (the first-stage resin replica portions) 41da isolated from the peripheries are formed first and then the second-stage resin layer portions (the second-stage resin replica portions) 41db surrounded by the first-stage resin layer portions 41da are formed. At this time, the resin amount for forming each first-stage resin layer portion (the first-stage resin replica portion) 41da in the first process is defined to be about the same or greater than the resin amount for forming each second-stage resin layer portion (the second-stage resin replica portion) 41db in the second process. Therefore, at the boundary between the first-stage resin layer portion 41da and the second-stage resin layer portion 41db, the joint portion 48 at which the resin overlaps is formed, whereby occurrence of an undercut shape can be avoided. Therefore, in a molding process using the sub-master die 40 and the sub-sub-master die 50 obtained from the sub-master die 40, occurrence of an undesired shape can be avoided, whereby mold release resistance can be reduced or eliminated. In this manner, by reducing formation of local mold release resistance distribution and suppressing local deformation during the molding of the wafer lens 10, a difference in shape among multiple optical lenses 4 existing in the wafer lens 10 can be eliminated and molding accuracy can be increased, whereby the optical lens 4 which is stable in accuracy can be provided.

Second Embodiment

Hereinafter, a method for producing a molding die and the like according to a second embodiment will be described.

The present embodiment is a modification of, for example, the production method for the molding die of the first embodiment and components or matters which are not especially described are the same as those of the first embodiment.

Figure 14A:
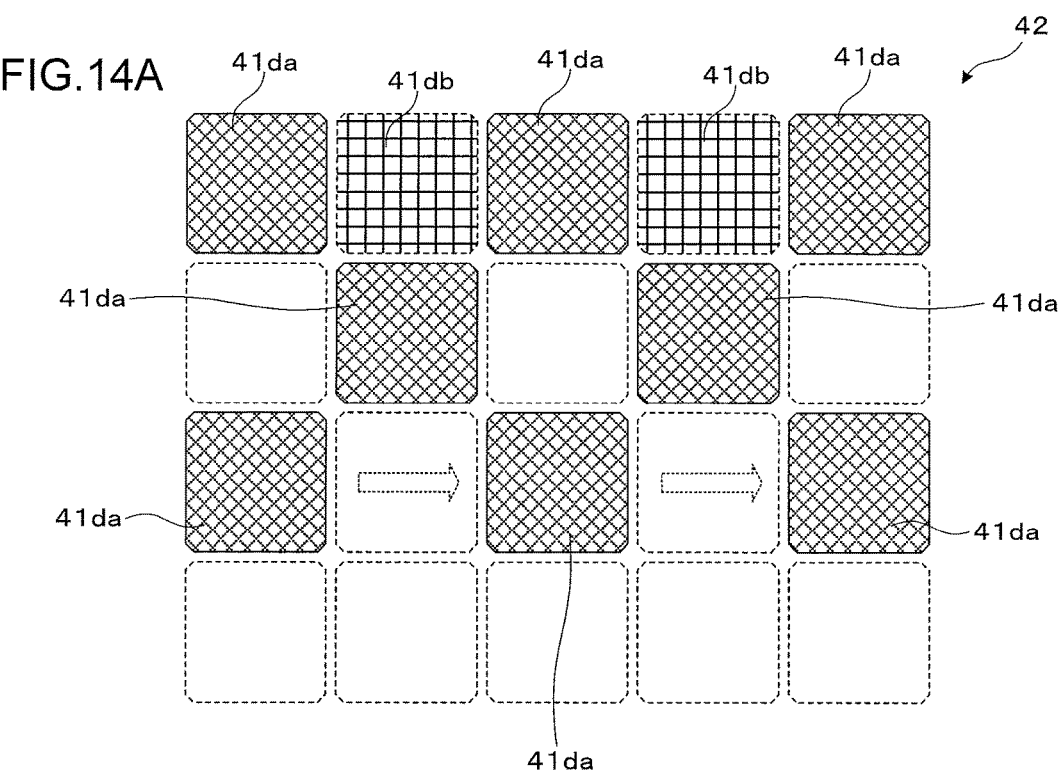
FIGS. 14A and 14B are diagrams explaining the order in which resin layer portions are formed on the sub-master substrate in a production method for a second embodiment.
Figure 14B:
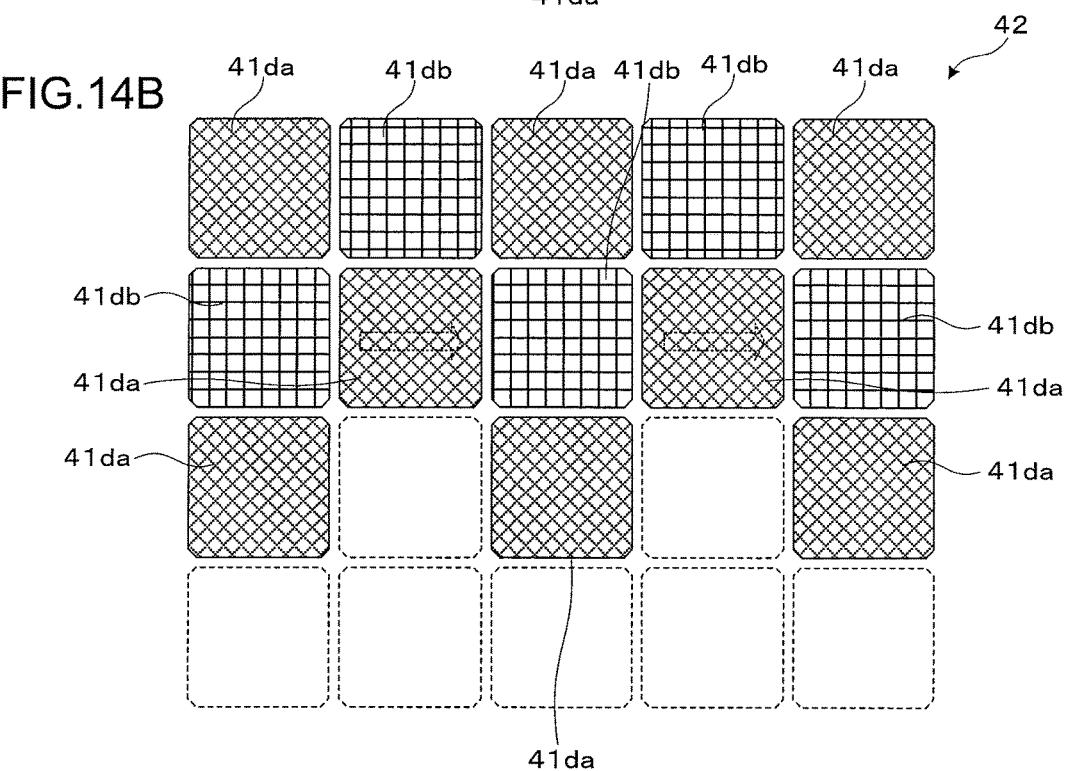

As illustrated in FIGS. 14A and 14B, in the production method for the second embodiment, a first-stage resin layer portion (a first-stage resin replica portion) 41da and a second-stage resin layer portion (a second-stage resin replica portion) 41db are formed simultaneously in parallel. That is, in a process of forming the first-stage resin replica portions sequentially from the first row with respect to one of alternate positions of the checkerboard pattern, when an area surrounded by the first-stage resin replica portions is produced at the other of alternate positions of the checkerboard pattern, by forming the first-stage resin replica portions of a subsequent row, the second-stage resin replica portion is molded at the area surrounded by the first-stage resin replica portions. In the example illustrated in FIGS. 14A and 14B, since the first-stage resin layer portions 41da of the third row from the top are formed, areas surrounded by the first-stage resin layer portions 41da of the first, second and third rows from the top are produced and the second-stage resin layer portions 41db are formed in these areas. In the stage illustrated in FIG. 14A, the first-stage resin layer portions 41da of the third row from the top are formed alternately and, in stage illustrated in the next FIG. 14B, returning to the second row from the top, the second-stage resin layer portions 41db are formed alternately. Note that, in end rows of a plurality of first-stage resin layer portions 41da formed in a matrix pattern, it is not possible to surround the second-stage resin layer portions 41db at four sides. Therefore, it is only necessary to form the second-stage resin layer portion 41db when three or two sides thereof are surrounded. The first row in FIG. 14A illustrates that the second-stage resin layer portion 41db is formed in an area surrounded by three sides in the first row after the first-stage resin layer portions 41da of the first row and the second row are formed. The point is, when at least one area, among the other of alternate positions of the checkerboard pattern described above, of which all the sides to be surrounded are surrounded by the first-stage resin replica portions is produced, the second-stage resin replica portion may be formed at that area.

Note that the present invention is not limited to the above-described embodiment and can be suitably modified in a range without departing from the spirit and scope thereof.

For example, in the embodiment described above, although the lens resin layer 12 and the like are made of light-curing resin and the resin materials are cured by light irradiation, the curing may be accelerated by heating in addition to light irradiation. Alternatively, instead of the light-curing resin, the resin layers may be made of other energy-curing resin, such as thermosetting resin.

Although there is no particular limitation in the method for moving the master die 30 with respect to the sub-master substrate 42, it is desirable to employ a path to move to an adjoining recessed portion 42c if possible because a moving time becomes short. The sub-master substrate 42 may be moved with respect to the master die 30, or both of them may be moved. The same principle applies when the resin is pressed by the master die 30 and the sub-master substrate 42: instead of pressing the master die 30 against the sub-master substrate 42, the sub-master substrate 42 may be pressed against the master die 30, of both of them may be moved close to each other.

Although a lens provided with, on the substrate, the resin layer which functions as the optical lens (the lens substrate) has been described as the finally obtained wafer lens in the embodiment described above, the wafer lens is not limited to the same: a wafer lens may include no independent substrate made of a different material and the like, and a portion which functions as an optical lens, a flat portion in the periphery of the optical lens, and a portion which connects the optical lens and the flat portion may be configured integrally by resin. In this case, a wafer lens in which an optical lens portion and a peripheral portion thereof are formed integrally can be produced by disposing the resin material between two molding dies and letting the resin material cured.

Although an example in which the wafer lens is produced using the sub-sub-master die has been described in the embodiment described above, the production of the wafer lens is not limited to the same: the wafer lens may be produced using the sub-master die. In this case, the master die used as an original is a positive type of a lens element of the wafer lens which is the finally molded product. That is, in the production of the wafer lens 10 illustrated in FIGS. 9A to 9C, if the sub-sub-master die 50 is considered as a sub-master die, the wafer lens 10 illustrated in FIG. 1 and, eventually, the optical lens 4 illustrated in FIG. 2 can be obtained. Note that both the first lens resin layer 12 and the second lens resin layer 13 may be molded using the sub-sub-master die, both of them may be molded using the sub-master die, or one of them may be molded using the sub-sub-master die and the other may be molded using the sub-master die.

Although it is supposed that the recessed portions 42c are provided in the sub-master substrate 42 in the description above, it is also possible to directly transfer the resin layer portions (the resin replica portions) 41da and 41db to the sub-master substrate 42 without providing the recessed portions 42c.

The invention claimed is:

1. A method for producing a molding die, in which the molding die includes a plurality of resin replica portions that are obtained by molding the plurality of resin replica portions on a first substrate by repeatedly using a master die, which comprises a first molding surface on which a shape corresponding to an optical lens is formed, the method comprising:
a first process of forming, at one of alternate positions of a checkerboard pattern of the first substrate, a plurality of first-stage resin replica portions among the plurality of resin replica portions by disposing a resin material between the master die and the first substrate;
a second process of forming, at the other of alternate positions of the checkerboard pattern of the first substrate, a plurality of second-stage resin replica portions among the plurality of resin replica portions by disposing the resin material between the master die and the first substrate,
wherein, in the second process, each of the second-stage resin replica portions is formed such that a side edge of each of the second-stage resin replica portions overlaps a side edge of each of the first-stage resin replica portions formed in the first process.

2. The method for producing a molding die according to claim 1, wherein the first molding surface comprises a plurality of first optical transfer surfaces arranged in two dimensions.

3. A method for producing a molding die, in which the molding die includes a plurality of resin replica portions that are obtained by molding the plurality of resin replica portions on a first substrate by repeatedly using a master die, which comprises a first molding surface on which a shape corresponding to an optical lens is formed, the method comprising:
a first process of forming, at one of alternate positions of a checkerboard pattern of the first substrate, a plurality of first-stage resin replica portions among the plurality of resin replica portions by disposing a resin material between the master die and the first substrate;
a second process of forming, at the other of alternate positions of the checkerboard pattern of the first substrate, a plurality of second-stage resin replica portions among the plurality of resin replica portions by disposing the resin material between the master die and the first substrate,
wherein, in the second process, each of the second-stage resin replica portions is formed such that an end of each of the second-stage resin replica portions overlaps an end of each of the first-stage resin replica portions formed in the first process,
wherein during the first process a portion of the resin extends by a distance, P, from an edge of the master die at the one of alternative positions of the checkerboard pattern of the first substrate toward the other of alternate positions of the checkerboard pattern of the first substrate, wherein 0.5 G<P<G, wherein G is defined to be a distance between the master die, when present at the one of alternative positions of the checkerboard pattern of the first substrate during the first process, and the master die, when present at the other of alternative positions of the checkerboard pattern of the first substrate during the second process.

4. The method for producing a molding die according to claim 1, wherein a resin amount for forming each of the first-stage resin replica portions in the first process is defined to be greater than a resin amount for forming each of the second-stage resin replica portions in the second process.

5. The method for producing a molding die according to claim 4, wherein a ratio of the resin amount in the first process to the resin amount in the second process is higher or equal to 1.05 and is lower or equal to 2.00.

6. The method for producing a molding die according to claim 1, wherein the master die comprises an end portion of prism-like shape which is chamfered at corners thereof.

7. The method for producing a molding die according to claim 6, wherein the end portion of the master die comprises chamfered flat surfaces at the corners, and a breadth of each flat surface is one-twentieth or greater and is one-third or smaller of a width of one of two wall surfaces of the master die adjacent the flat surface.

8. The method for producing a molding die according to claim 1, wherein, when at least one area, among the other of alternate positions of the checkerboard pattern, of which all sides capable of being surrounded are surrounded by the first-stage resin replica portions is produced, the second-stage resin replica portion is formed at that area.

9. The method for producing a molding die according to claim 1, wherein the first substrate comprises a recessed portion which is greater in size than the first molding surface and has a shape closed inside itself at a molding position corresponding to either one the first-stage resin replica portions or one of the second-stage resin replica portions, and the master die comprises an annular step around the first molding surface.

10. The method for producing a molding die according to claim 1, wherein the first process comprises:

a first transfer process to obtain the resin replica portion to which the first molding surface is transferred by filling a space between the first molding surface and a first molding position on the first substrate with a first resin material, curing the first resin material, and then releasing the master die, wherein the first molding position is among the one of alternative positions of the checkerboard pattern; and a first repeating process to obtain a first shape transfer layer in which the plurality of resin replica portions are arranged in two dimensions on the first substrate by repeatedly performing the first transfer process while changing relative positions of the master die and the first substrate among the one of alternative positions of the checkerboard pattern, and wherein the second process comprises:

a second transfer process to obtain the resin replica portion to which the first molding surface is transferred by filling a space between the first molding surface and a second molding position on the first substrate with the first resin material, curing the first resin material, and then releasing the master die, wherein the second molding position is among the other of alternative positions of the checkerboard pattern; and a second repeating process to obtain a first shape transfer layer in which the plurality of resin replica portions are arranged in two dimensions on the first substrate by repeatedly performing the second transfer process while changing relative positions of the master die and the first substrate among the other of alternative positions of the checkerboard pattern.

11. A method for producing a second molding die comprising a second shape transfer layer, the method comprising:

using a molding die which comprises a first shape transfer layer obtained by the method for producing a molding die according to claim 10 as a first molding die;

filling a space between the first molding die and a second substrate for a molding die with a second resin material;

curing the second resin material, and releasing the first molding die.

12. A method for producing a wafer lens in which the wafer lens which includes a plurality of lens elements formed on a front surface of a third substrate is obtained by filling a space between the second molding die obtained by the method for producing a molding die according to claim 11, and the third substrate with a third resin material, curing the third resin material, and releasing the molding die.

13. A method for producing a wafer lens in which the wafer lens which includes a plurality of lens elements formed on a back surface and a front surface of the third substrate is obtained by filling a space between the second molding die obtained by the method for producing a molding die according to claim 11, and a back surface of the wafer lens, in which a plurality of lens elements are formed on the front surface thereof, obtained by the method for producing a wafer lens according to claim 12 with a fourth resin material, curing the fourth resin material, and releasing the molding die.

14. A method for producing an optical lens comprising a process to divide, into single pieces, by cutting the wafer lens obtained by the method for producing a wafer lens according to claim 12.

15. A method for producing a wafer lens in which the wafer lens which includes a plurality of lens elements formed on a front surface of a third substrate is obtained by filling a space between the molding die obtained by the method for producing a molding die according to claim 10, and the third substrate with a third resin material, curing the third resin material, and releasing the molding die.

16. A method for producing a wafer lens in which the wafer lens which includes a plurality of lens elements formed on a back surface and a front surface of the third substrate is obtained by filling a space between the molding die obtained by the method for producing a molding die according to claim 10, and a back surface of the wafer lens, in which a plurality of lens elements are formed on the front surface thereof, obtained by the method for producing a wafer lens according to claim 12 with a fourth resin material, curing the fourth resin material, and releasing the molding die.

17. A method for producing an optical lens comprising a process to divide, into single pieces, by cutting the wafer lens obtained by the method for producing a wafer lens according to claim 13.

18. A method for producing an optical lens comprising a process to divide, into single pieces, by cutting the wafer lens obtained by the method for producing a wafer lens according to claim 15.

19. A method for producing an optical lens comprising a process to divide, into single pieces, by cutting the wafer lens obtained by the method for producing a wafer lens according to claim 16.

* * * * *